(12) United States Patent
Yaeda et al.

(10) Patent No.: US 12,112,739 B2
(45) Date of Patent: Oct. 8, 2024

(54) INFORMATION PROCESSING DEVICE AND INFORMATION PROCESSING METHOD

(71) Applicant: SONY GROUP CORPORATION, Tokyo (JP)

(72) Inventors: Juri Yaeda, Tokyo (JP); Saki Yokoyama, Tokyo (JP); Chiaki Miyazaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 449 days.

(21) Appl. No.: 17/309,314

(22) PCT Filed: Nov. 14, 2019

(86) PCT No.: PCT/JP2019/044631
§ 371 (c)(1),
(2) Date: May 18, 2021

(87) PCT Pub. No.: WO2020/110744
PCT Pub. Date: Jun. 4, 2020

(65) Prior Publication Data
US 2022/0028368 A1     Jan. 27, 2022

(30) Foreign Application Priority Data
Nov. 28, 2018   (JP) ................................ 2018-222407

(51) Int. Cl.
*G10L 13/08*     (2013.01)
*G10L 15/22*     (2006.01)
*G10L 15/26*     (2006.01)

(52) U.S. Cl.
CPC .............. *G10L 13/08* (2013.01); *G10L 15/22* (2013.01); *G10L 15/26* (2013.01); *G10L 2015/225* (2013.01)

(58) Field of Classification Search
None
See application file for complete search history.

(56) References Cited

U.S. PATENT DOCUMENTS 9,905,220 B2 *  2/2018  Fructuoso ............... G06F 40/58
2005/0256717 A1  11/2005  Miyata et al.
(Continued)

FOREIGN PATENT DOCUMENTS

CN      104464731 A     3/2015
CN      105702248 A     6/2016
(Continued)

OTHER PUBLICATIONS

International Search Report and Written Opinion of PCT Application No. PCT/JP2019/044631, issued on Feb. 4, 2020, 09 pages of ISRWO.

*Primary Examiner* — Quynh H Nguyen
(74) *Attorney, Agent, or Firm* — CHIP LAW GROUP

(57) ABSTRACT

Provided are an information processing device and an information processing method capable of responding to an utterance of a user with a correct pronunciation. The information processing device generates a response text indicating contents of a response to an utterance of a user on the basis of an utterance text indicating contents of the utterance of the user, and outputs the response text to which pronunciation information indicating a reading of a character string included in the response text is added.

10 Claims, 18 Drawing Sheets

(56) References Cited

U.S. PATENT DOCUMENTS

2014/0019135 A1    1/2014   Talwar et al.
2016/0163312 A1    6/2016   Henton et al.

FOREIGN PATENT DOCUMENTS

| | | |
|---|---|---|
| EP | 3032532 A1 | 6/2016 |
| JP | 2005-321730 A | 11/2005 |
| JP | 2013-205999 A | 10/2013 |
| JP | 2014-145842 A | 8/2014 |
| JP | 2015-060210 A | 3/2015 |
| JP | 2016-122183 A | 7/2016 |
| JP | 2016-201643 A | 12/2016 |

\* cited by examiner

FIG. 11

| CHARACTER STRING | READING | CATEGORY |
| --- | --- | --- |
| TEN MINUTES/SUFFICIENT | TEN MINUTES | TIME |
| | SUFFICIENT | QUANTITY |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/044631 filed on Nov. 14, 2019, which claims priority benefit of Japanese Patent Application No. JP 2018-222407 filed in the Japan Patent Office on Nov. 28, 2018. Each of the above-referenced applications is hereby incorporated herein by reference in its entirety.

TECHNICAL FIELD

The present technology relates to an information processing device, an information processing method, and a program, and more particularly to an information processing device, an information processing method, and a program capable of responding to an utterance of a user with a correct pronunciation.

BACKGROUND ART

With advances in voice recognition technology and artificial intelligence technology, a device equipped with a voice assistant function is becoming widespread. For example, a voice dialogue using a natural utterance is archived in which the device responds to a user's utterance of "Tell me the weather" with a voice of "Today's weather is sunny".

Such a voice dialogue is mainly achieved by a series of processing including voice recognition in which a voice of a user is converted into a text, language analysis in which results of the voice recognition are analyzed and an intention of the user is estimated, response generation in which a response text according to the intention of the user is generated, and voice synthesis in which the response text is converted into a voice.

CITATION LIST

Patent Document

Patent Document 1: Japanese Patent Application Laid-Open No. 2016-201643

SUMMARY OF THE INVENTION

Problems to be Solved by the Invention

The voice synthesis, which is the final processing for achieving the voice dialogue, is performed such that the response text generated by the response generation is converted into a symbolic linguistic expression indicating a reading and a prosody. The prosody includes pitch, rhythm, intonation, and the like.

Here, a reading of a character string included in the response text is selected by use of, for example, a language dictionary. A reading of each character string is registered in the language dictionary.

In a case where a plurality of readings is registered for one character string with the same notation in the language dictionary, a wrong reading, which is not expected by the user, may be added to the character string. In this case, contents of the response may not be correctly communicated to the user.

The present technology has been made in view of such a situation, and makes it possible to respond to an utterance of a user with a correct pronunciation.

Solutions to Problems

An information processing device of one aspect of the present technology includes a dialogue management unit that generates a response text indicating contents of a response to an utterance of a user on the basis of an utterance text indicating contents of the utterance of the user, and outputs the response text to which pronunciation information indicating a reading of a character string included in the response text is added.

In one aspect of the present technology, the response text indicating the contents of the response to the utterance of the user is generated on the basis of the utterance text indicating the contents of the utterance of the user, and the response text to which the pronunciation information indicating the reading of the character string included in the response text is added is output.

BRIEF DESCRIPTION OF DRAWINGS

FIG. 11 is a diagram illustrating an example of description of a pronunciation information predefined database.

MODE FOR CARRYING OUT THE INVENTION

Hereinafter, a mode for carrying out the present technology will be described. The description will be made in the following order.

1. Example of Voice Dialogue in Information Processing System
2. Configuration of Information Processing System
3. Specific Examples of Addition of Pronunciation Information
4. Operation of Information Processing System
5. Modified Example <<Example of Voice Dialogue in Information Processing System>>

Figure 1:
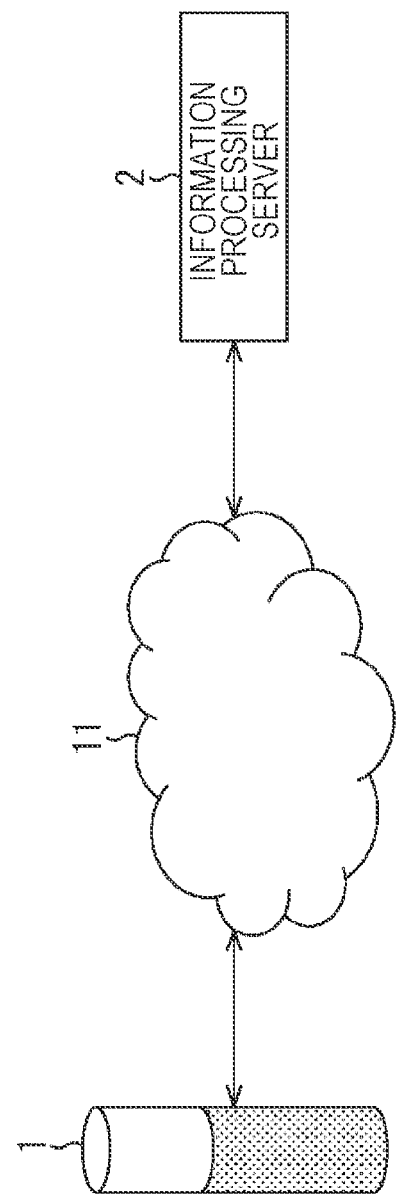
FIG. 1 is a diagram illustrating a configuration example of an information processing system according to an embodiment of the present technology.

FIG. 1 is a diagram illustrating a configuration example of an information processing system according to an embodiment of the present technology.

The information processing system of FIG. 1 is configured by connecting an information processing terminal 1 and an information processing server 2 via a network 11 such as the Internet. The information processing terminal 1 and the information processing server 2 collaborate to perform processing, so that a so-called voice assistant function is achieved. A user can have the information processing system execute various functions such as research, schedule registration, and message transmission by voice.

The information processing terminal 1 includes input/output devices such as a microphone (microphone), a camera, and a speaker. These input/output devices are provided at predetermined positions in a cylindrical housing. The information processing terminal 1 detects an utterance of the user with the microphone and transmits voice data to the information processing server 2.

The information processing server 2 estimates an intention of the user by analyzing the voice data transmitted from the information processing terminal 1, and performs processing for achieving a function according to the intention of the user. The information processing server 2 transmits a processing result to the information processing terminal 1, and causes the information processing terminal 1 to output the processing result as a response to the user. For example, in a case where the user makes an utterance to do research, a synthetic voice for notifying the user of a result of the research is output from the speaker of the information processing terminal 1.

As described above, in the information processing system illustrated in FIG. 1, basically, the information processing terminal 1 takes charge of a user interface (UI) function, and the information processing server 2 takes charge of executing the processing for achieving the function according to the intention of the user, so that the voice assistant function is achieved.

Furthermore, in the information processing system of FIG. 1, the synthetic voice output from the information processing terminal 1 as the response to the utterance of the user is output with a correct pronunciation according to the intention of the user.

Figure 2:
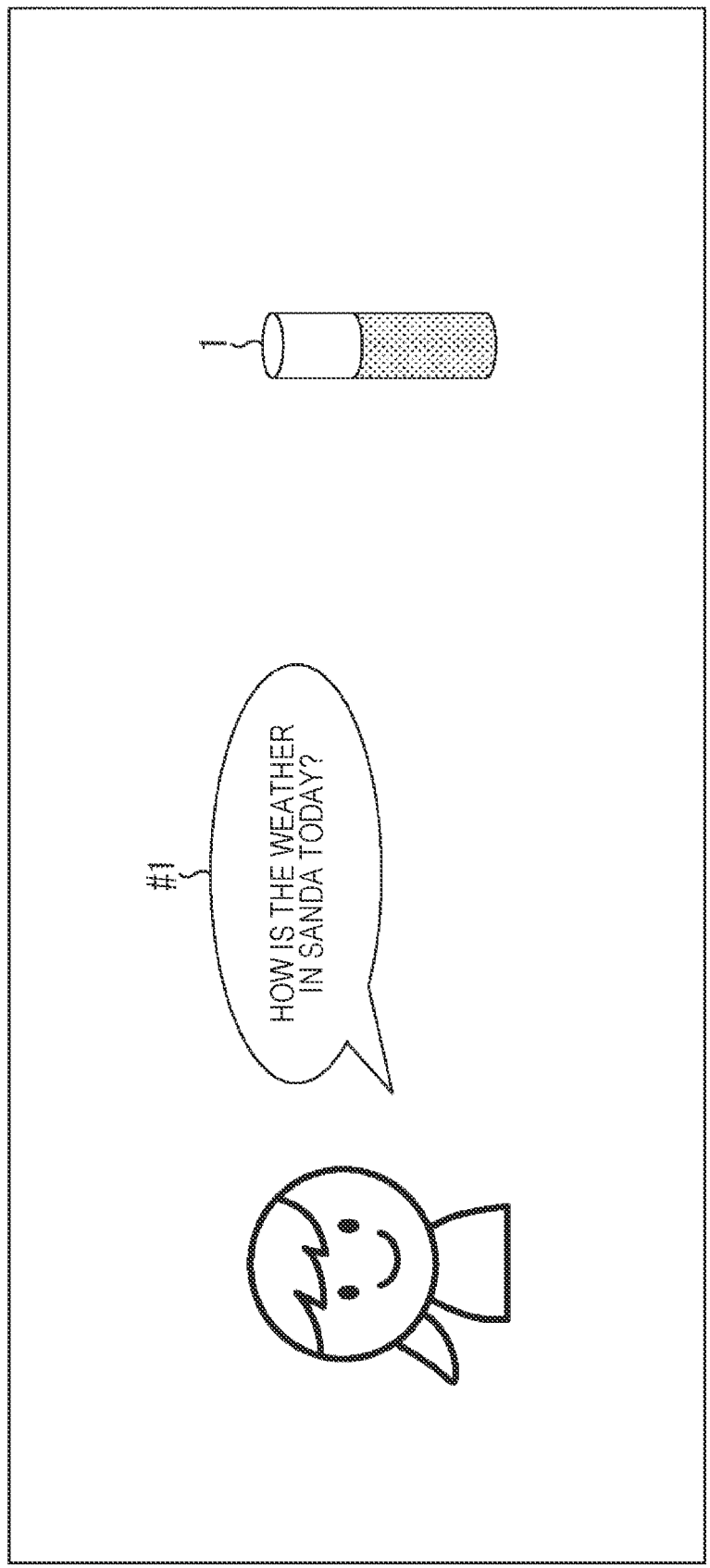
FIG. 2 is a diagram illustrating an example of an utterance.

FIG. 2 is a diagram illustrating an example of the utterance.

As illustrated in a balloon #1, a case where the user utters "How is the weather in Sanda today?" will be described. Such an utterance is an utterance in which the user requests the information processing system to check the weather of "Sanda".

Hereinafter, an utterance in which the user requests something from the information processing system is appropriately referred to as a request utterance.

Here, regarding a character string (word) of "Sanda/Mita" included in the request utterance, it is assumed that the user pronounces "Sanda". "Sanda" is a place name.

Note that, in FIG. 2, configurations of the information processing server 2 and the like located ahead of the information processing terminal 1 from a point of view of the user are not illustrated. The same applies to other drawings such as FIG. 5.

Figure 3:
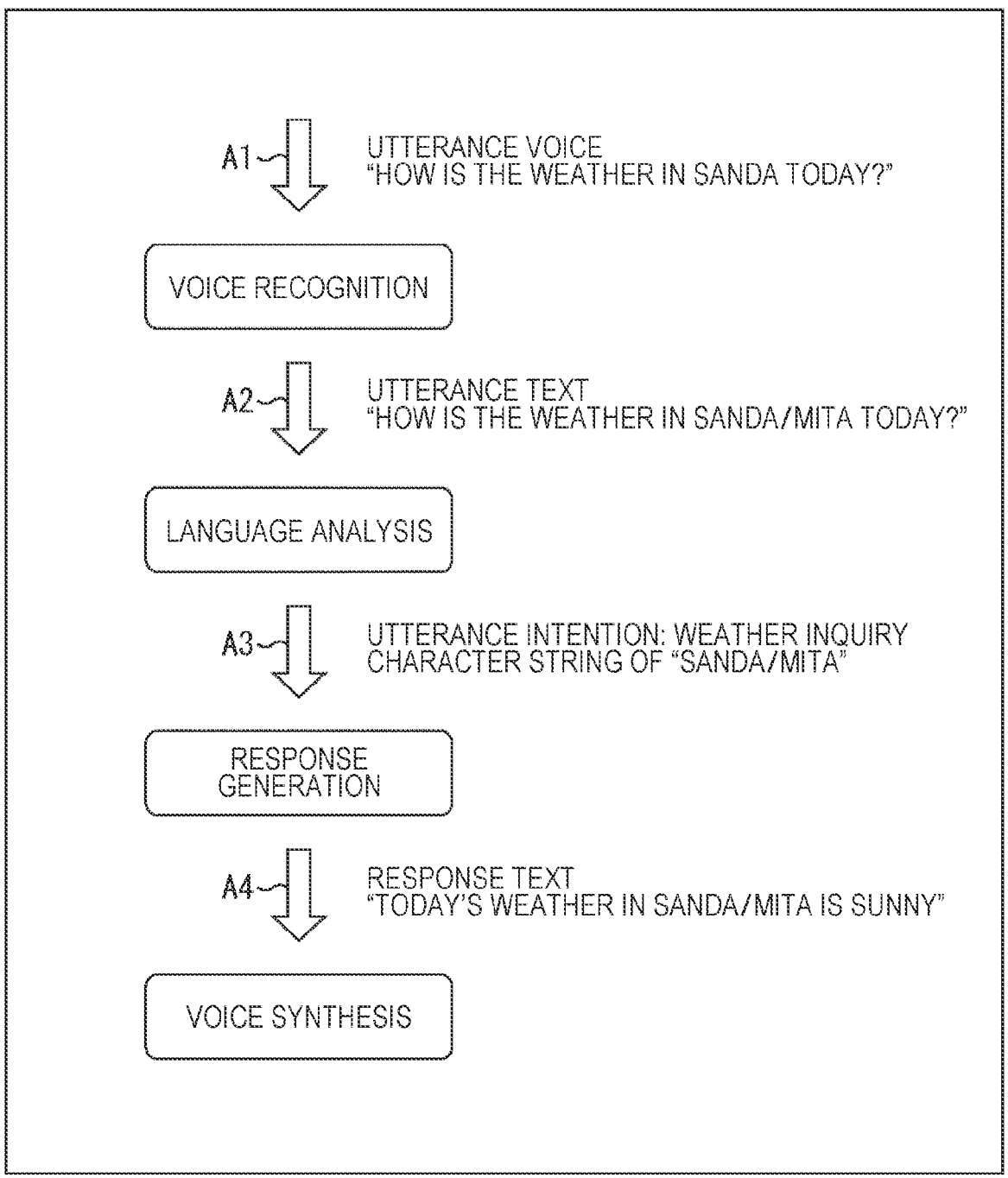
FIG. 3 is a diagram illustrating an example of a series of processing for achieving a voice dialogue.

FIG. 3 is a diagram illustrating an example of a series of processing for achieving a voice dialogue.

In a case where the request utterance of "How is the weather in Sanda today?" is made by the user, voice recognition is performed on the voice data of the request utterance, as indicated by an arrow A1. When the voice recognition is performed, an utterance text as text data of "How is the weather in Sanda/Mita today?", which is obtained by converting the voice data of the request utterance into a text, is generated.

In the voice recognition by the information processing server 2, as will be described later, pronunciation information of "How is the weather in Sanda today?" is generated together with the utterance text. The pronunciation information includes information indicating a reading of each character string when the user makes the request utterance and information indicating a prosody.

As indicated at a tip of an arrow A2, language analysis is performed on the utterance text of "How is the weather in Sanda/Mita today?" included in results of the voice recognition. When the language analysis is performed, the intention of the user who makes the request utterance is estimated. Furthermore, a character string included in the utterance text is extracted. In the example of FIG. 3, the user's intention of "weather inquiry" is estimated, and the character string of "Sanda/Mita" is extracted.

As indicated at a tip of an arrow A3, response generation is performed according to the intention of the user and the character string obtained by the language analysis. The response generation generates a response text as text data indicating contents of the response according to the request utterance of the user.

For example, a weather search is performed on the basis of the character string of "Sanda/Mita" indicating a place name, and the weather of "Sanda/Mita" is acquired as a search result. The response text is generated so as to include a character string of, for example, "sunny" indicating the weather of "Sanda/Mita" obtained as the search result. In the example of FIG. 3, a response text of "Today's weather in Sanda/Mita is sunny" is generated.

As indicated at a tip of an arrow A4, voice synthesis is performed on the basis of the response text of "Today's weather in Sanda/Mita is sunny" obtained by the response generation.

In a case where the request utterance is made by the user, for example, the information processing server 2 performs the series of processing as described above. On the basis of a result of voice synthesis by the information processing server 2, a response voice as the synthetic voice for presenting the contents of the response to the user is output from the speaker of the information processing terminal 1.

Here, a reading of a place name having the notation of "Sanda/Mita" includes, for example, "Mita" in addition to "Sanda". A place where "Sanda/Mita" is pronounced as "Sanda" and a place where "Sanda/Mita" is pronounced as "Mita" are different places.

Figure 4:
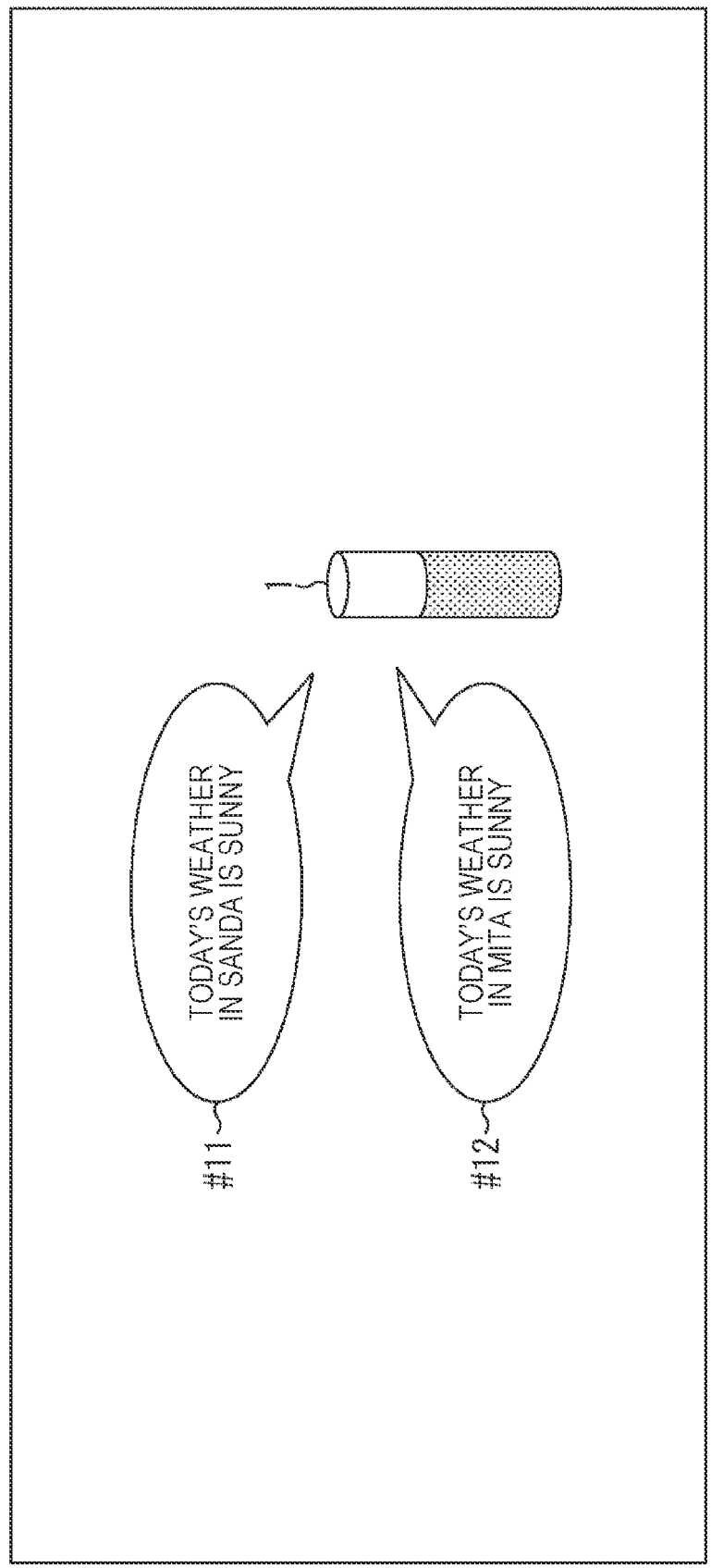
FIG. 4 is a diagram illustrating an example of the utterance.

Therefore, in a case where the voice synthesis is performed only on the basis of the response text, a response voice of "Today's weather in Sanda is sunny" may be output as indicated in a balloon #11 in FIG. 4, or a response voice of "Today's weather in Mita is sunny" may be output as indicated in a balloon #12. That is, the character string of "Sanda/Mita" included in the response text may be pronounced as "Sanda" or "Mita".

In this example, since the user wants to know the weather of "Sanda", the response voice indicated in the balloon #12, which pronounces the character string of "Sanda/Mita" as "Mita", does not meet the intention of the user.

In the information processing server 2, in order to perform the voice synthesis in which the character string of "Sanda/Mita" is pronounced as "Sanda", pronunciation information indicating that the character string of "Sanda/Mita" is pronounced as "Sanda" is added to the character string of "Sanda/Mita" included in the response text.

Figure 5:
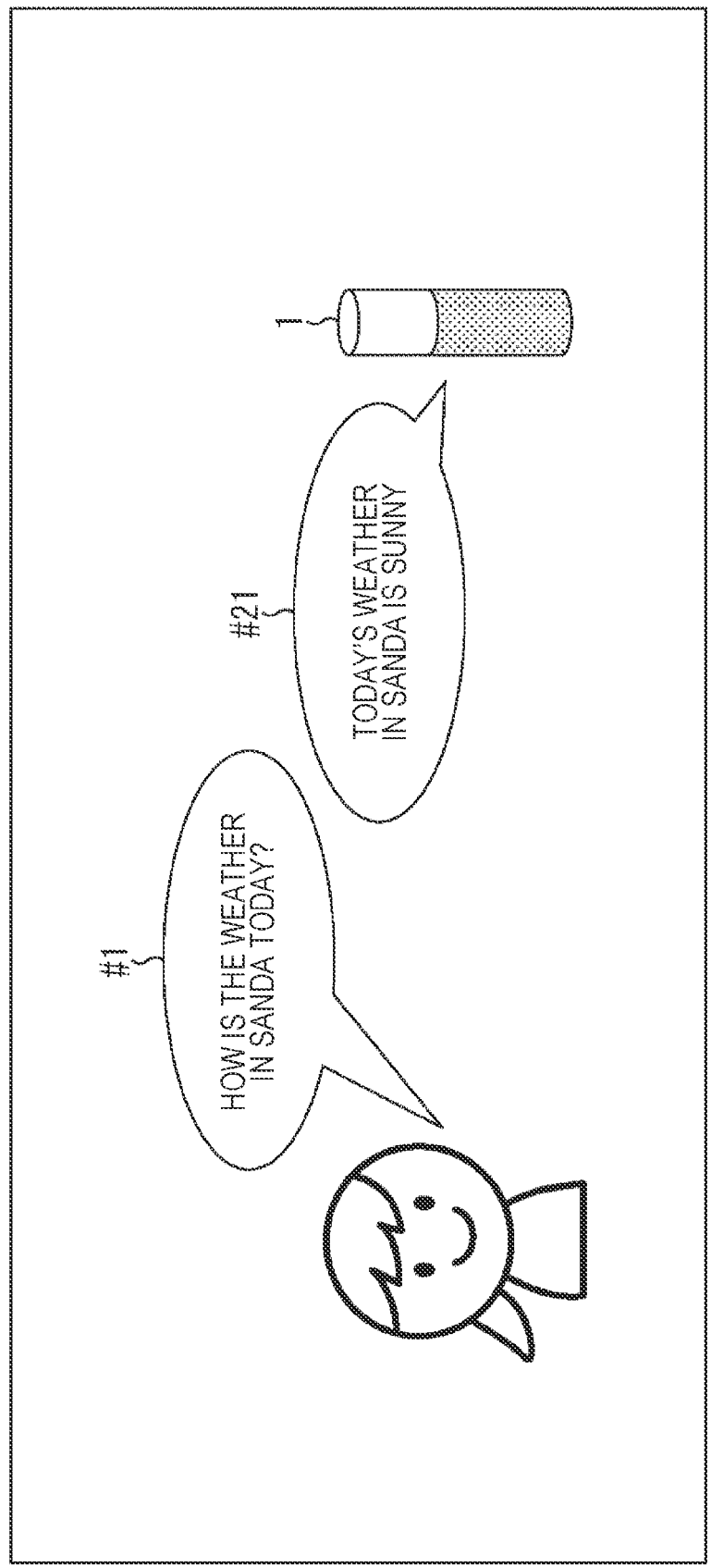
FIG. 5 is a diagram illustrating an example of the utterance.

When the voice synthesis is performed on the basis of the response text to which the pronunciation information is added to the character string of "Sanda/Mita", "Today's weather in Sanda is sunny", which is the response voice that pronounces the character string of "Sanda/Mita" as "Sanda", is output as indicated in a balloon #21 in FIG. 5.

The pronunciation information indicating that the character string of "Sanda/Mita" is pronounced as "Sanda" is added on the basis of, for example, the fact that the character string of "Sanda/Mita" included in the response text is also included in the utterance text, and the user has pronounced, as "Sanda", the character string of "Sanda/Mita" included in the utterance text.

When the voice synthesis is performed on the basis of the response text including the character string to which the pronunciation information is added, the information processing server 2 can cause the information processing terminal 1 to output the response voice with the pronunciation according to the intention of the user.

Furthermore, the information processing server 2 can correctly communicate the contents of the response to the user. In a case where feedback is given in a form of including a pronunciation contrary to the intention of the user, the contents of the response may not be correctly communicated to the user, but such a situation can be prevented.

Figure 6:
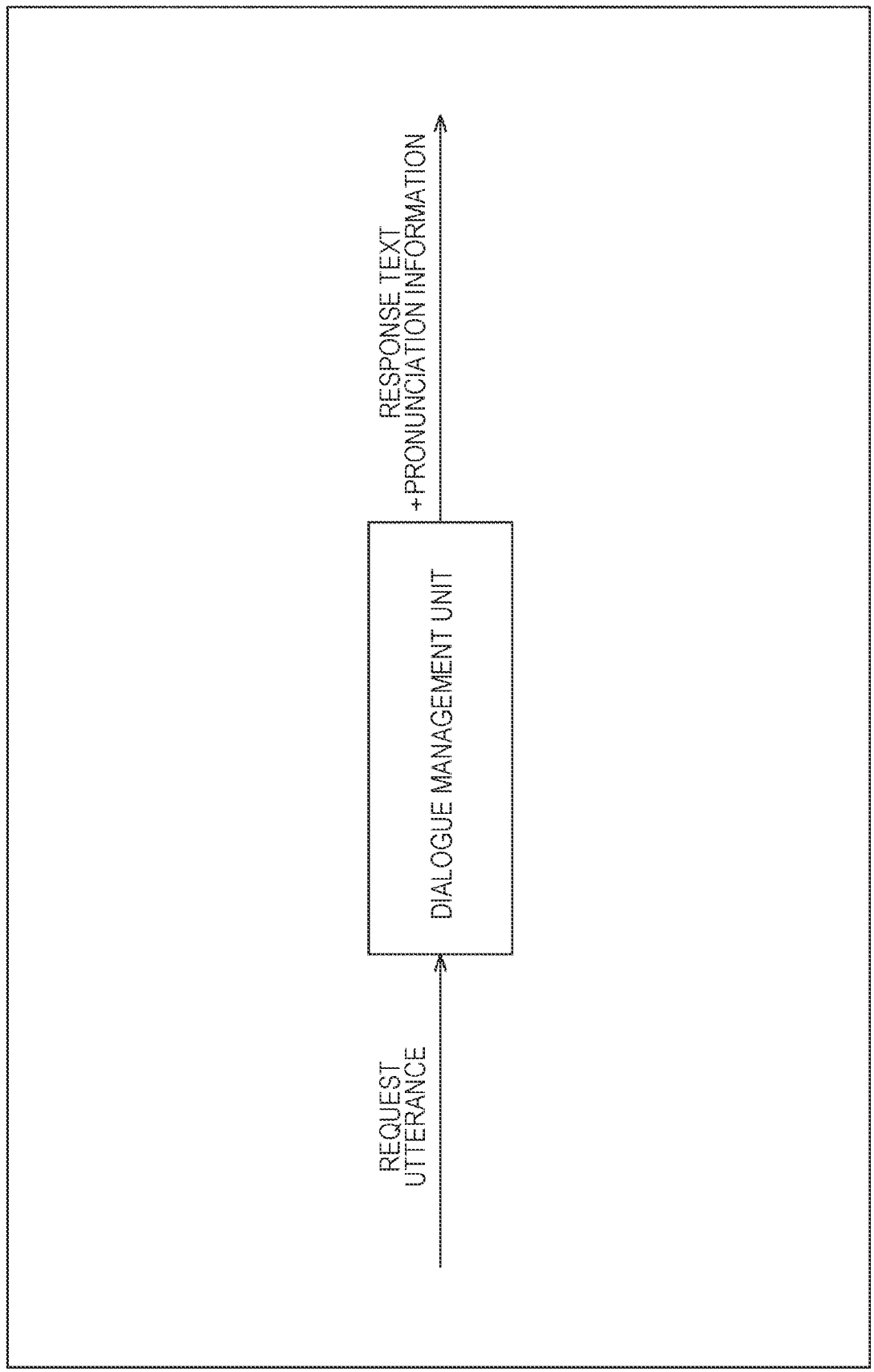
FIG. 6 is a diagram illustrating a concept of processing of an information processing server.

FIG. 6 is a diagram illustrating a concept of processing of the information processing server 2.

As illustrated in FIG. 6, a dialogue management unit of the information processing server 2 receives, as an input, the request utterance by the user, and outputs the response text to which the pronunciation information is added. The voice synthesis is performed by a subsequent processing unit on the basis of the response text to which the pronunciation information is added.

As described above, the information processing server 2 functions as an information processing device that receives, as an input, the request utterance by the user and outputs the response text and the pronunciation information. The details of the operation of the information processing server 2 will be described later.

<<Configuration of Information Processing System>>
<Configuration Example of Information Processing Terminal>

Figure 7:
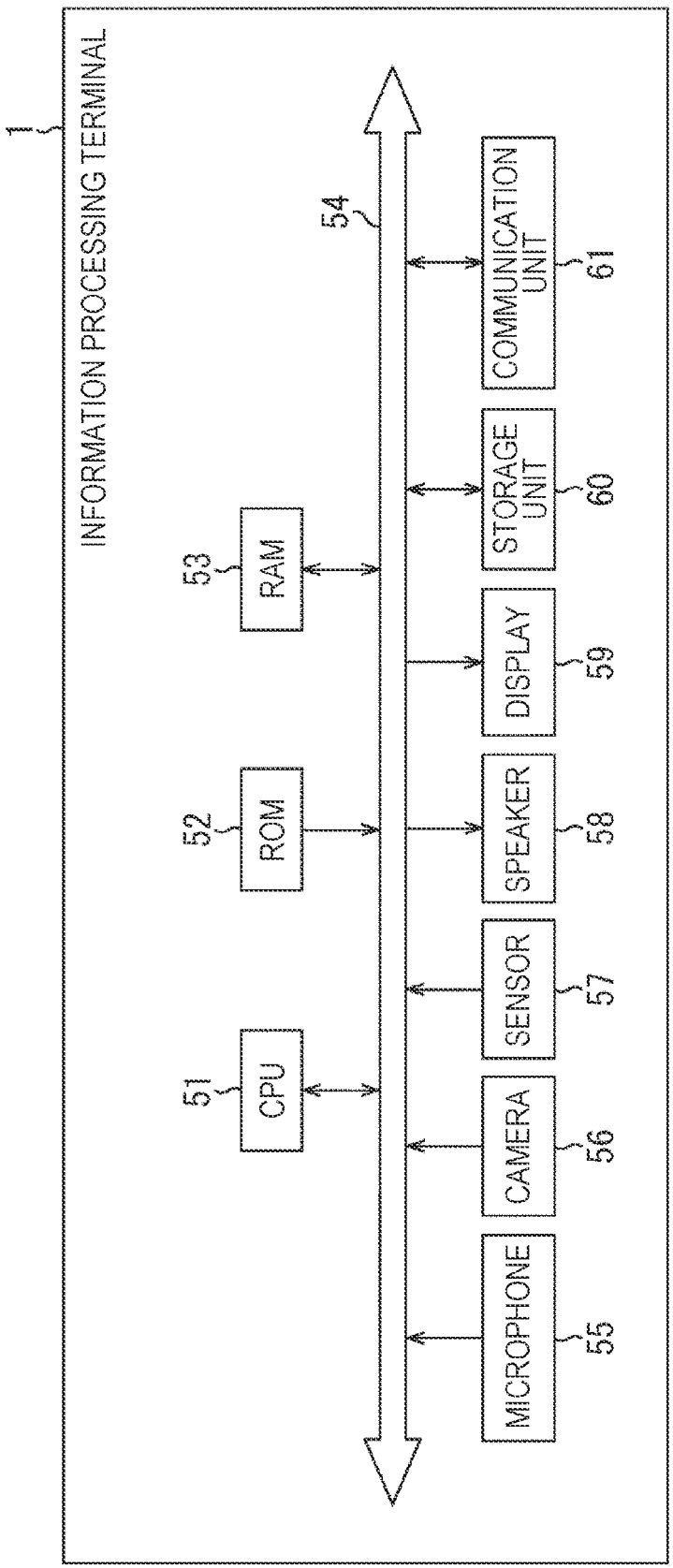
FIG. 7 is a block diagram illustrating a hardware configuration example of an information processing terminal.

FIG. 7 is a block diagram illustrating a hardware configuration example of the information processing terminal 1.

A central processing unit (CPU) 51, a read only memory (ROM) 52, and a random access memory (RAM) 53 are connected to each other by a bus 54.

A microphone 55, a camera 56, a sensor 57, a speaker 58, a display 59, a storage unit 60, and a communication unit 61 are connected to the bus 54.

The microphone 55 detects various sounds such as a voice of the user and an environmental sound.

The camera 56 captures an image of surroundings of the information processing terminal 1, which includes the user.

The sensor 57 includes various sensors such as an illuminance sensor that detects the brightness of the surroundings, a distance measuring sensor that measures a distance to a surrounding object, and a positioning sensor that uses a global positioning system (GPS).

The speaker 58 responds to the request utterance of the user by outputting the synthetic voice, for example, under the control of the information processing server 2.

The display 59 includes a display such as an LCD or an organic EL display. Various types of information are presented on the display 59, for example, under the control of the information processing server 2.

The storage unit 60 includes a non-volatile memory and the like. The storage unit 60 stores various types of data such as a program executed by the CPU 51.

The communication unit 61 transmits and receives various types of information to and from an external device such as the information processing server 2 via wireless or wired communication. The communication unit 61 transmits, to the information processing server 2, voice data detected by the microphone 55, image data captured by the camera 56, and sensor data detected by the sensor 57.

Furthermore, the communication unit 61 receives the voice data transmitted from the information processing server 2, outputs the voice data to the speaker 58, and causes the speaker 58 to output the synthetic voice.

<Configuration Example of Information Processing Server>

Figure 8:
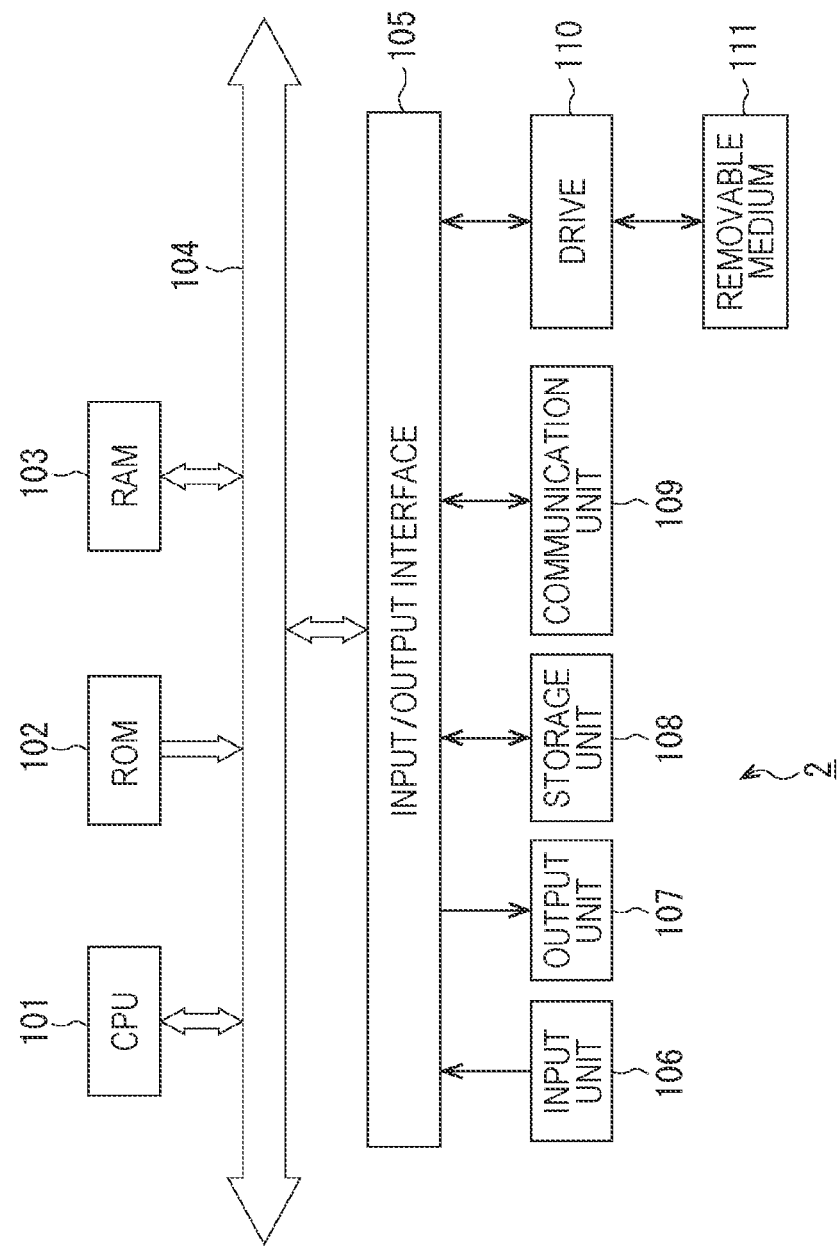
FIG. 8 is a block diagram illustrating a hardware configuration example of the information processing server.

FIG. 8 is a block diagram illustrating a hardware configuration example of the information processing server 2.

A CPU 101, a ROM 102, and a RAM 103 are connected to each other by a bus 104.

An input/output interface 105 is further connected to the bus 104. An input unit 106 including a keyboard, a mouse, and the like, and an output unit 107 including a display, a speaker, and the like are connected to the input/output interface 105.

Furthermore, a storage unit 108 including a hard disk, a non-volatile memory, and the like, a communication unit 109 including a network interface and the like, and a drive 110 for driving a removable medium 111 are connected to the input/output interface 105.

The information processing server 2 is configured by a computer having such a configuration. The information processing server 2 may be configured by a plurality of computers instead of one computer.

Figure 9:
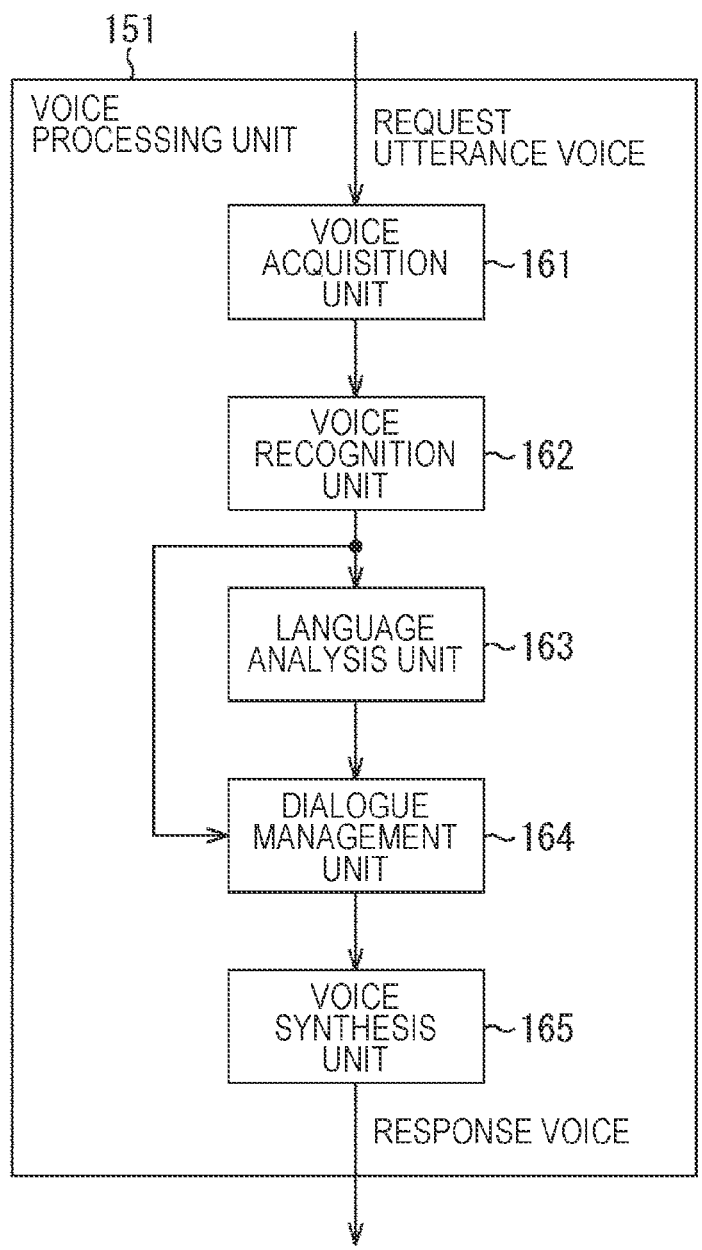
FIG. 9 is a block diagram illustrating a functional configuration example of the information processing server.

FIG. 9 is a block diagram illustrating a functional configuration example of the information processing server 2.

At least a part of the configuration illustrated in FIG. 9 is implemented by the CPU 101 of FIG. 8 executing a predetermined program.

As illustrated in FIG. 9, a voice processing unit 151 is implemented in the information processing server 2. The voice processing unit 151 includes a voice acquisition unit 161, a voice recognition unit 162, a language analysis unit 163, a dialogue management unit 164, and a voice synthesis unit 165. The voice data of the request utterance transmitted from the information processing terminal 1 and received by the communication unit 109 is input to the voice acquisition unit 161.

The voice acquisition unit 161 acquires the voice data of the request utterance. The voice data acquired by the voice acquisition unit 161 is supplied to the voice recognition unit 162.

The voice recognition unit 162 performs the voice recognition on the voice data of the request utterance supplied from the voice acquisition unit 161, and outputs the utterance text and the pronunciation information. As described above, the pronunciation information includes the information indicating the reading of each character string when the user makes the request utterance, and the information indicating the prosody. The utterance text and the pronunciation information output from the voice recognition unit 162 are supplied to the language analysis unit 163 and the dialogue management unit 164.

The language analysis unit 163 performs the language analysis on the utterance text, and estimates the intention of the user. Furthermore, the language analysis unit 163 extracts the character string included in the utterance text. Information indicating the intention of the user estimated by the language analysis being performed and information regarding the character string extracted from the utterance text are supplied to the dialogue management unit 164.

The dialogue management unit 164 generates the response text on the basis of results of the language analysis by the language analysis unit 163.

Furthermore, the dialogue management unit 164 adds the pronunciation information to the response text. The pronunciation information is added with reference to the results of the voice recognition by the voice recognition unit 162, information registered in advance in a database, and a history of addition of the pronunciation information, as appropriate. The response text to which the pronunciation information is added by the dialogue management unit 164 is supplied to the voice synthesis unit 165.

Note that the pronunciation information may not be added to all character strings constituting the response text, but the pronunciation information may be added to a part of the character strings. That is, the addition of the pronunciation information by the dialogue management unit 164 is performed for at least a part of the character strings constituting the response text. Not only the information indicating the reading of the character string but also the information indicating the prosody may be included in the pronunciation information.

The voice synthesis unit 165 performs the voice synthesis on the basis of the response text, and generates the response voice having a pronunciation indicated by the pronunciation information. By the voice synthesis, the reading indicated by the pronunciation information is set as a reading of the character string included in the response text.

Furthermore, the prosody indicated by the pronunciation information is set as a prosody of the response text. The prosody of the entire response text may be set on the basis of the pronunciation information, or the prosody of a part of the character strings may be set on the basis of the pronunciation information.

The response voice data obtained by the voice synthesis unit 165 performing the voice synthesis is transmitted from the communication unit 109 to the information processing terminal 1.

The voice processing unit 151 is appropriately provided with a configuration for implementing each function of the voice assistant function, such as a function of managing a schedule input by the request utterance and a function of searching according to the request utterance.

Figure 10:
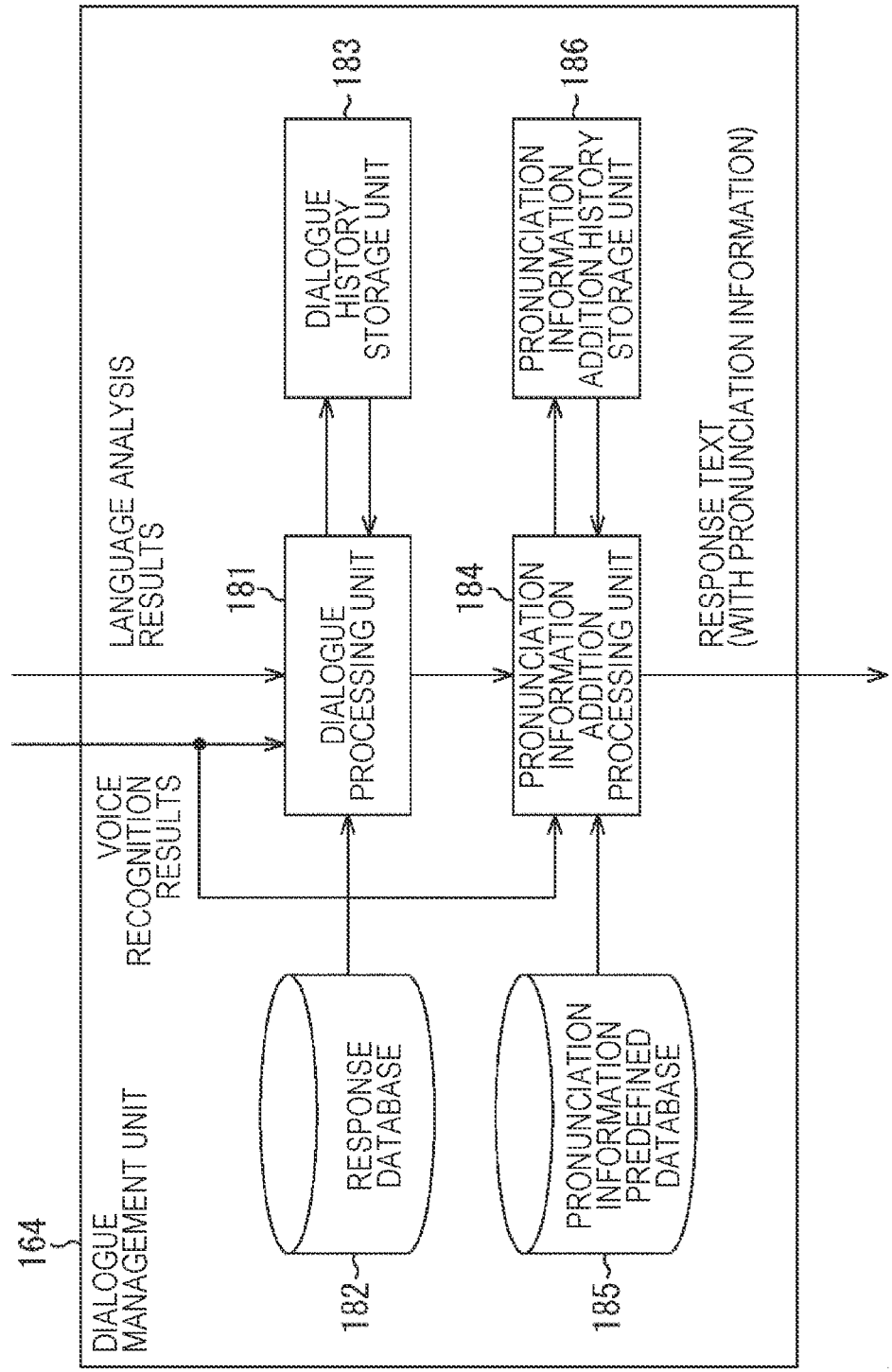
FIG. 10 is a block diagram illustrating a configuration example of a dialogue management unit of FIG. 9.

FIG. 10 is a block diagram illustrating a configuration example of the dialogue management unit 164 of FIG. 9.

As illustrated in FIG. 10, the dialogue management unit 164 includes a dialogue processing unit 181, a response database 182, a dialogue history storage unit 183, a pronunciation information addition processing unit 184, a pronunciation information predefined database 185, and a pronunciation information addition history storage unit 186.

The utterance text and the pronunciation information output from the voice recognition unit 162 as the results of the voice recognition are input to the dialogue processing unit 181 and the pronunciation information addition processing unit 184. Furthermore, the information indicating the intention of the user and the information regarding the character string extracted from the utterance text, which are output from the language analysis unit 163 as the results of the language analysis, are input to the dialogue processing unit 181.

The response database 182 and the pronunciation information predefined database 185 may be provided outside the dialogue management unit 164. Furthermore, the response database 182 and the pronunciation information predefined database 185 may be provided in another device connected via the network 11.

The dialogue processing unit 181 refers to the response database 182, and generates the response text as an appropriate response to the utterance text. The response text generated by the dialogue processing unit 181 is supplied to the pronunciation information addition processing unit 184.

Furthermore, the dialogue processing unit 181 associates the utterance text with the response text, and outputs the correspondence to the dialogue history storage unit 183, and the dialogue history storage unit 183 stores the correspondence as a dialogue history. The response text is generated by the dialogue processing unit 181 with reference to the dialogue history stored in the dialogue history storage unit 183 as appropriate.

The response database 182 is a database of response texts corresponding to various utterance texts. For example, the response database 182 includes information for performing a general conversation such as outputting a response voice of "Welcome back" in a case where the user utters "I'm home". In addition, the response database 182 includes information for outputting a response text for notifying the user of a daily schedule of the user or notifying the user of the weather of the day in a case where the user utters "Good morning".

The dialogue history storage unit 183 stores the dialogue history on the basis of the information supplied from the dialogue processing unit 181. The dialogue history may include information regarding an application being run by the user when the request utterance is made.

The pronunciation information addition processing unit 184 analyzes the response text supplied from the dialogue processing unit 181, and adds, to the response text, the pronunciation information indicating the reading and the prosody of the character string included in the response text. The pronunciation information may include only the information indicating the reading of the character string included in the response text.

For example, the pronunciation information addition processing unit 184 adds the pronunciation information indicating, as a reading of a predetermined character string included in the response text, the same reading as a reading pronounced by the user on the basis of the results of the voice recognition by the voice recognition unit 162.

Furthermore, the pronunciation information addition processing unit 184 refers to information stored in the pronunciation information predefined database 185, and adds the pronunciation information indicating, as the reading of the predetermined character string, the same reading as a reading defined in advance in the pronunciation information predefined database 185.

The pronunciation information addition processing unit 184 refers to a history stored in the pronunciation information addition history storage unit 186, and adds the pronunciation information indicating, as the reading of the predetermined character string, the same reading as a reading added in the past.

The pronunciation information addition processing unit 184 associates the character string included in the response text with the pronunciation information, and outputs the correspondence to the pronunciation information addition history storage unit 186, and the pronunciation information addition history storage unit 186 stores the correspondence as a pronunciation information addition history.

The pronunciation information predefined database 185 is a database that defines the reading of each character string. For example, a plurality of readings is defined for one character string with the same notation.

The pronunciation information addition history storage unit 186 stores the pronunciation information addition history, which is a history of the pronunciation information added to the response text.

<<Specific Examples of Addition of Pronunciation Information>>

Here, specific examples of addition of the pronunciation information will be described.

<Addition Method Using Voice Recognition Results>

The above-described method of adding the pronunciation information indicating the reading of "Sanda" as the reading of the character string of "Sanda/Mita" included in the response text in a case where the request utterance of "How is the weather in Sanda today?" corresponds to an addition method using the results of the voice recognition.

That is, the dialogue processing unit 181 generates the response text of "Today's weather in Sanda/Mita is sunny" in response to the utterance text of "How is the weather in Sanda/Mita today?", which is a result of the voice recognition, and input of results of the language analysis.

The pronunciation information addition processing unit 184 analyzes the response text of "Today's weather in Sanda/Mita is sunny", and compares the response text with the utterance text to specify that the utterance text includes the same character string as the character string of "Sanda/Mita" included in the response text.

The pronunciation information addition processing unit 184 adds, as the reading of the character string of "Sanda/Mita" included in the response text, "Sanda", which is the same reading as the reading of "Sanda/Mita" pronounced by the user at the time of the request utterance. The reading of "Sanda/Mita" pronounced by the user at the time of the request utterance is indicated by the pronunciation information included in results of the voice recognition.

As a result, the information processing server 2 can cause the information processing terminal 1 to output the response voice with the same reading as "Sanda", which is the reading of "Sanda/Mita" pronounced by the user at the time of the request utterance.

Example in Case Where Request Utterance is Made in English

The addition of the pronunciation information as described above can be applied not only in the case where the utterance of the user is made in Japanese but also in a case where the utterance of the user is made in another language such as English.

For example, a case where a request utterance of "Add 25 W LED to my shopping list" is made in English to register an LED bulb having a power consumption of 25 W in a shopping list will be described. The shopping list is a function of managing items to be purchased.

Here, it is assumed that the user pronounces "twenty-five watt" for a character string of "25 W" included in the request utterance.

In this case, the dialogue processing unit 181 generates a response text of, for example, "25 W LED has been added to my shopping list" to notify the user that the registration to the shopping list has been completed, on the basis of results of the voice recognition and the language analysis for the request utterance.

The pronunciation information addition processing unit 184 adds, as a reading of the character string of "25 W" included in the response text, "twenty-five watt", which is the same reading as a reading of "25 W" pronounced by the user at the time of the request utterance. The reading of "25 W" pronounced by the user at the time of the request utterance is indicated by the pronunciation information included in the results of the voice recognition.

As a result, the information processing server 2 can prevent such voice synthesis that, for example, "25 W" included in the response text is pronounced as "two five double-u" or the like, which is not intended by the user. The information processing server 2 can cause the information processing terminal 1 to output the response voice with the same reading as "twenty-five watt", which is the reading of "25 W" pronounced by the user at the time of the request utterance.

OTHER EXAMPLES

For example, a character string of "teaching/professor" in Chinese has readings of "jiao1 shou4" and "juao4 shou4". The meaning of "teaching/professor" differs depending on the reading, such as "teaching" or "professor as a university teacher."

In a case where a response text in Chinese includes such a character string with a plurality of readings, when the utterance text includes the same character string, the same reading as a reading pronounced by the user at the time of the request utterance is set as a reading of the character string included in the response text.

Regarding a proper noun, a reading as an abbreviation and a reading as a general noun may differ. For example, "BOT" has a reading of "bot" as an abbreviation and a reading of "BOT" as a general noun. In addition, "Todai/Azuma Hiroshi" has a reading of "Todai" as an abbreviation of "The University of Tokyo" and a reading of "Azuma Hiroshi" as a general noun (personal name).

Similarly, in a case where the response text includes a character string having a plurality of readings such as a reading as an abbreviation and a reading as a general noun, the same reading as a reading pronounced by the user at the time of the request utterance is set.

A reading of a personal name with the same notation may differ depending on the place of origin and the mother tongue. For example, "Michael", which indicates a personal name, is read as "Michael" in English and "Michel" in French. Furthermore, "Michael" is read as "Michael" in German.

In this case as well, the same reading as a reading of "Michael" pronounced by the user at the time of the request utterance is set for a character string of "Michael" included in the response text.

<Addition Method Referring to Pronunciation Information Predefined Database>

FIG. 11 is a diagram illustrating an example of description of the pronunciation information predefined database 185.

Information illustrated in FIG. 11 is information that defines readings of a character string of "ten minutes/sufficient". In the example of FIG. 11, two readings of "ten minutes" and "sufficient" are defined as the readings of the character string of "ten minutes/sufficient". A category of time is set for the reading of "ten minutes", and a category of "quantity" is set for the reading of "sufficient".

As described above, in the pronunciation information predefined database 185, information that defines a plurality of readings for one character string with the same notation is described. A category according to the usage is set for each reading.

Figure 12:
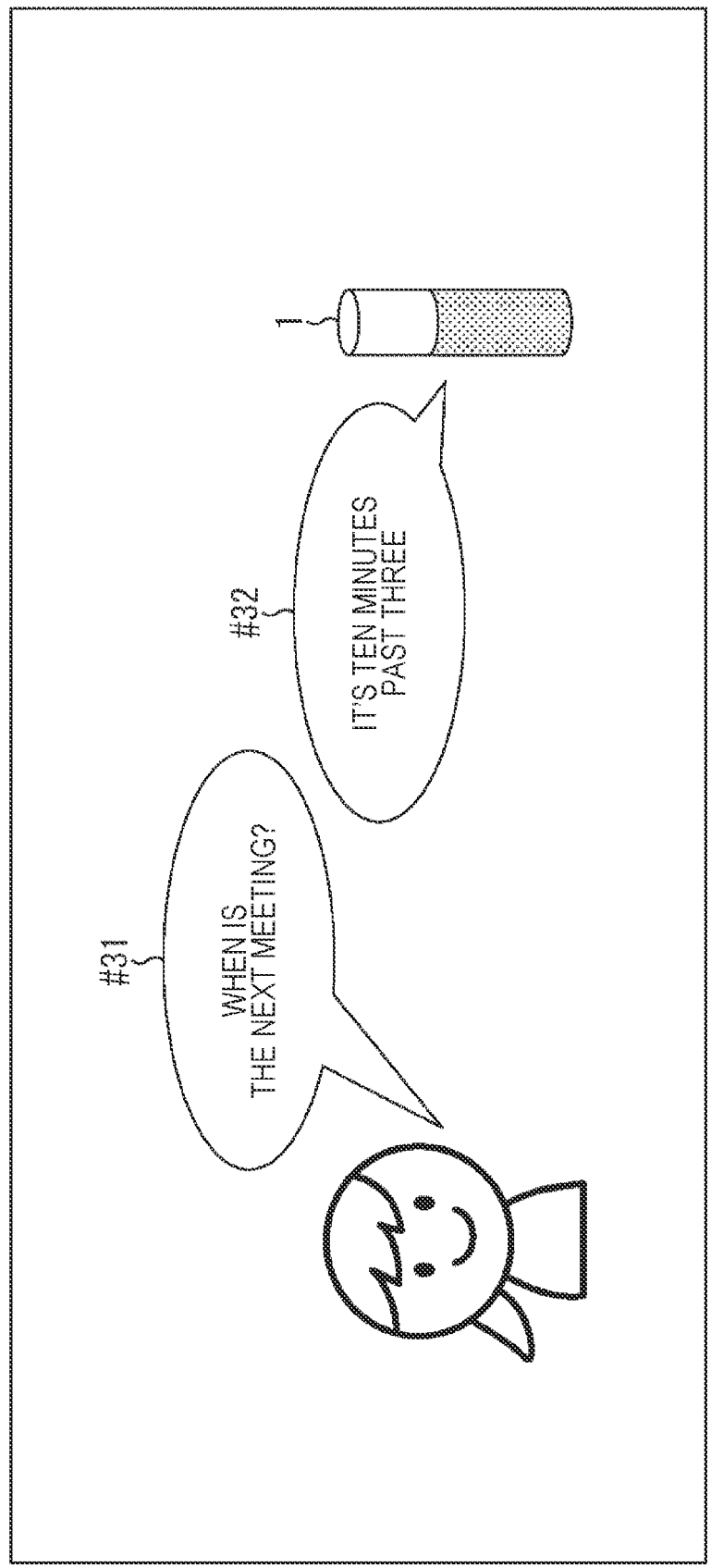
FIG. 12 is a diagram illustrating an example of the utterance.

FIG. 12 is a diagram illustrating an example of the utterance.

As illustrated in a balloon #31, a case where the user utters "When is the next meeting?" will be described. Such an utterance is a request utterance in which the user requests to check a schedule of the "next meeting". It is assumed that the user has registered the schedule of the meeting before making the request utterance illustrated in FIG. 12.

In this case, the dialogue processing unit 181 generates a response text of "It's ten minutes past three" in response to an utterance text of "When is the next meeting?", which is a result of the voice recognition, and input of results of the language analysis.

For example, the language analysis by the language analysis unit 163 estimates the user's intention to "inquire about the time of the meeting". The dialogue processing unit 181 specifies that the time of the meeting is "ten minutes past three", for example, by referring to the response database 182, and generates the response text of "It's ten minutes past three".

The pronunciation information addition processing unit 184 analyzes the response text of "It's ten minutes past three", and specifies that the two readings of "ten minutes" and "sufficient" are defined as the readings of the character string of "ten minutes/sufficient" in the pronunciation information predefined database 185.

The pronunciation information addition processing unit 184 adds, as the reading of the character string of "ten minutes/sufficient" included in the response text, the reading of "ten minutes", which is the same reading as the reading in the category of time according to the intention of the user.

As a result, the information processing server 2 can cause the information processing terminal 1 to output the response voice by use of "ten minutes", which is a reading related to time, as illustrated in a balloon #32 of FIG. 12.

As described above, it is possible to add the pronunciation information to the character string included in the response text with reference to contents of the pronunciation information predefined database 185.

In this example, a preferred reading is selected on the basis of the category according to the usage, but may be selected on the basis of other information.

For example, the reading may be selected on the basis of the application being run by the user when the request utterance is made. In this case, the information processing terminal 1, which takes charge of the UI function, is implemented not by the smart speaker as described above, but by a smartphone or a tablet terminal that executes various applications.

For example, it is assumed that, in a case where the user is running a telephone directory application, a request utterance of "What is Yumiko's telephone number?" is made.

In this case, for example, the dialogue processing unit 181 generates, on the basis of results of the voice recognition and the language analysis for the request utterance, a response text of "It's 08012345678" including a character string indicating a telephone number associated with a personal name of "Yumiko".

The pronunciation information addition processing unit 184 adds, as readings of character strings of "080", "1234", and "5678" included in the response text, "zero-eight-zero", "one-two-three-four", and "five-six-seven-eight", on the basis of the description in the pronunciation information predefined database 185.

For example, the pronunciation information predefined database 185 defines that "zero-eight-zero" is used as the reading of the character string of "080" in a response to the request utterance while the telephone directory application is running. Furthermore, the pronunciation information predefined database 185 defines that "one-two-three-four" is used as the reading of the character string of "1234", and "five-six-seven-eight" is used as the reading of the character string of "5678".

That is, the pronunciation information predefined database 185 defines that the reading in which the numbers are read one by one is prioritized in the response to the request utterance while the telephone directory application is running.

As a result, the information processing server 2 can prevent such voice synthesis that, for example, "1234" included in the response text is pronounced as "one thousand two hundred thirty-four" or the like, which is not intended by the user.

In a case where a plurality of users uses one information processing terminal 1, the pronunciation information predefined database 185 may be provided for each user.

In this case, an utterer is identified on the basis of an utterance voice or on the basis of an image captured by the camera 56 provided in the information processing terminal 1, and a reading is added by use of the pronunciation information predefined database 185 for a user identified as the utterer.

A configuration may be adopted in which the contents of the pronunciation information predefined database 185 prepared for each user can be edited by the user himself/herself.

Furthermore, a personal attribute of the utterer may be reflected in the pronunciation information predefined database 185. The personal attribute includes the place of origin, place of residence, age, gender, hobbies, tastes, and the like.

In this case, in the pronunciation information predefined database 185, the person attribute is associated with each of a plurality of readings with the same notation. The pronunciation information is added so as to prioritize a reading according to the attribute of the utterer who makes the request utterance.

As a result, the information processing server 2 can cause the information processing terminal 1 to respond with the synthetic voice using the reading according to the attribute of the utterer.

<Addition Method Referring to Pronunciation Information Addition History>

Figure 13:
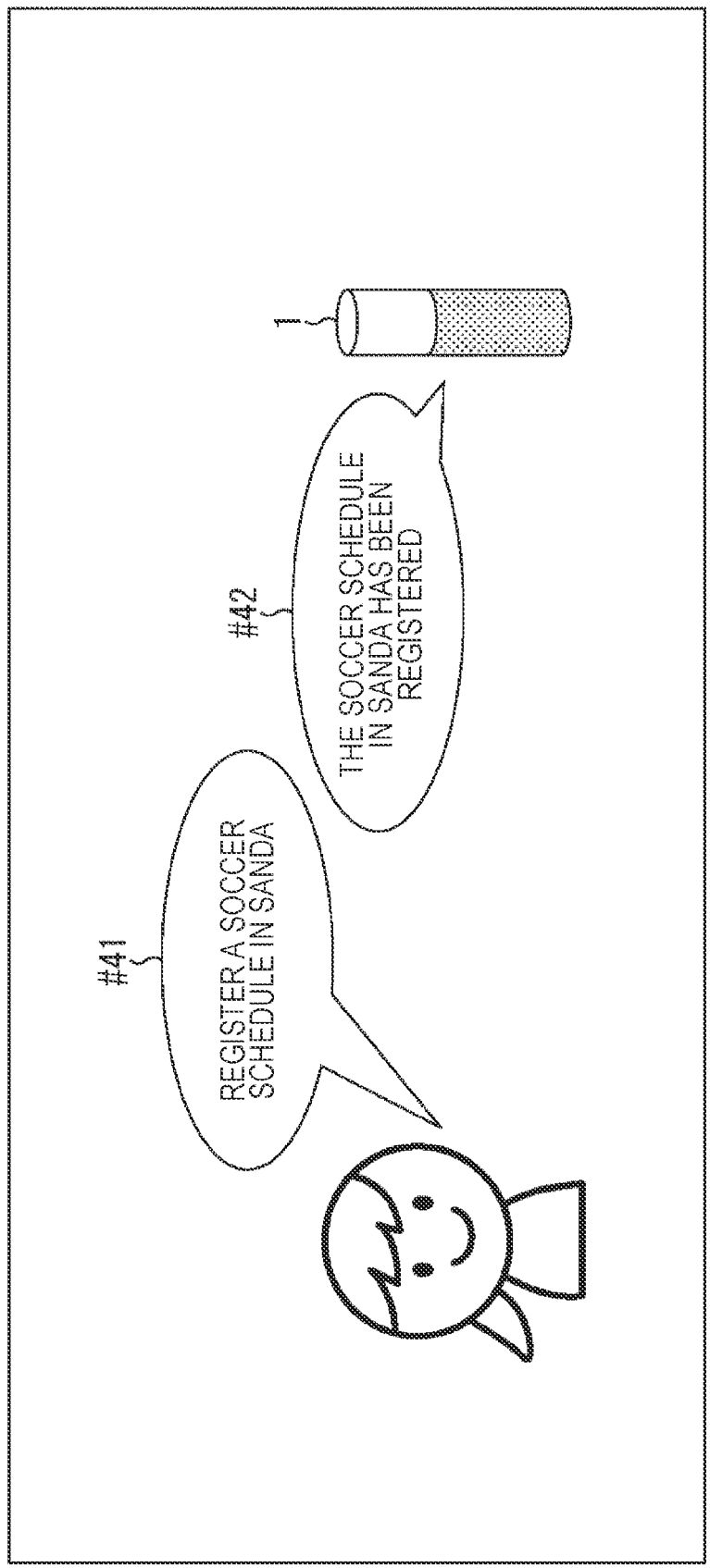
FIG. 13 is a diagram illustrating an example of the utterance.

FIG. 13 is a diagram illustrating an example of the utterance.

As illustrated in a balloon #41, a case where the user utters "Register a soccer schedule in Sanda" will be described. Such an utterance is a request utterance in which the user requests to register a schedule such as "playing soccer in Sanda".

In this case, the language analysis by the language analysis unit 163 estimates the user's intention to "register the soccer schedule". Furthermore, a processing unit not illustrated registers the schedule of "playing soccer in Sanda" on the basis of the estimated intention of the user.

The dialogue processing unit 181 generates a response text of "The soccer schedule in Sanda/Mita has been registered" in response to an utterance text of "Register a soccer schedule in Sanda/Mita", which is a result of the voice recognition, and input of results of the language analysis.

The pronunciation information addition processing unit 184 adds, as the reading of the character string of "Sanda/Mita" included in the response text, "Sanda", which is the same reading as the reading of "Sanda/Mita" pronounced by the user at the time of the request utterance. The reading of "Sanda/Mita" pronounced by the user at the time of the request utterance is indicated by the pronunciation information included in results of the voice recognition. This method of adding the pronunciation information is the addition method using the voice recognition results as described above.

As a result, the information processing server 2 can cause the information processing terminal 1 to output a response voice of "The soccer schedule in Sanda has been registered", which uses "Sanda" as the reading of the character string of "Sanda/Mita", as illustrated in a balloon #42 in FIG. 13.

In a case where such a reading is added, the pronunciation information addition processing unit 184 causes the pronunciation information addition history storage unit 186 to store information indicating that "Sanda" has been added as the reading of the character string of "Sanda/Mita". The pronunciation information addition history storage unit 186 stores a history of the character string to which the reading is added.

Figure 14:
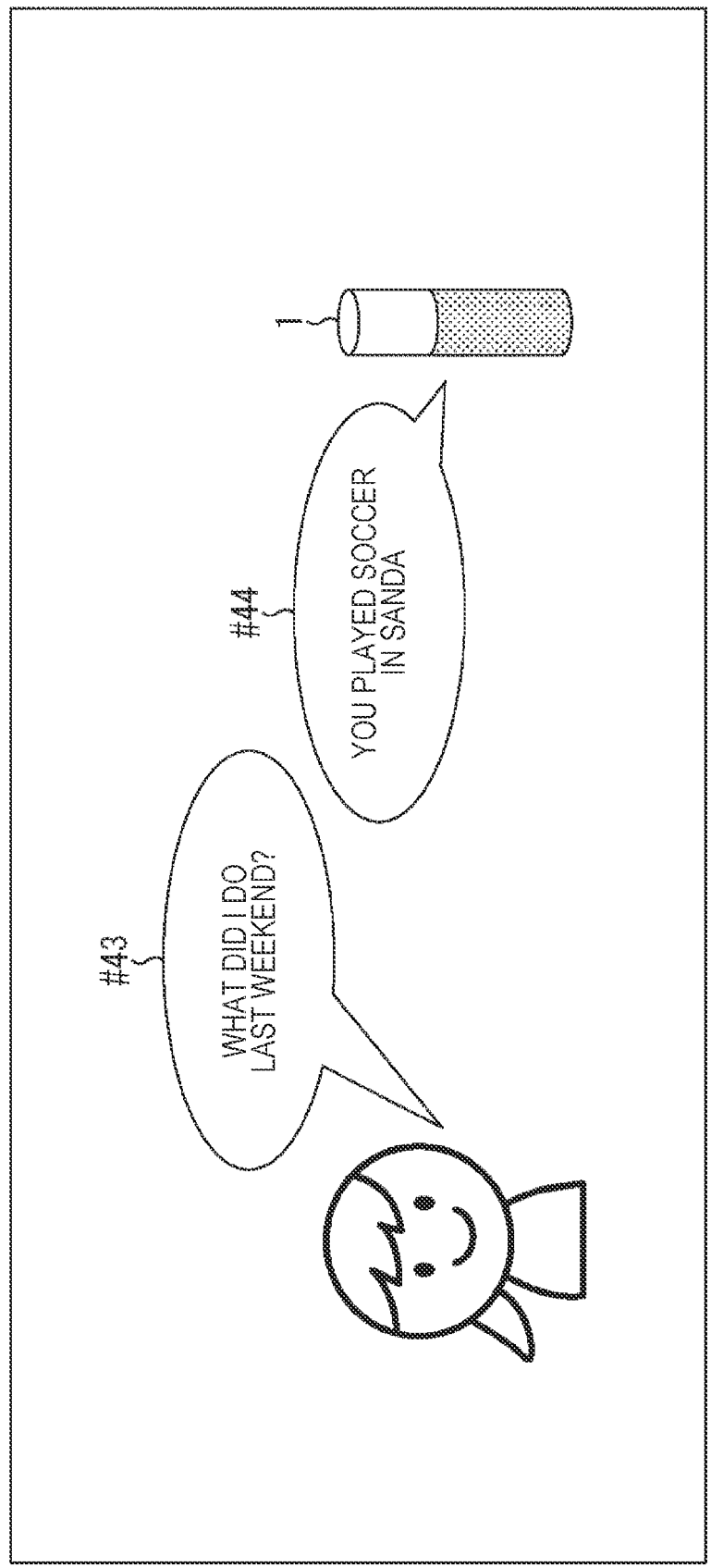
FIG. 14 is a diagram illustrating an example of the utterance.

FIG. 14 is a diagram illustrating an example of utterances in the week following the week in which the utterances exchanged as illustrated in FIG. 13 took place.

The utterance exchange illustrated in FIG. 14 is a conversation in a state where the information indicating that "Sanda" was added as the reading of the character string of "Sanda/Mita" is stored in the pronunciation information addition history storage unit 186.

As illustrated in a balloon #43, a case where the user utters "What did I do last weekend?" will be described. Such an utterance is a request utterance in which the user requests to check a "schedule in the last weekend".

In this case, the dialogue processing unit 181 generates a response text of "You played soccer in Sanda/Mita" in response to an utterance text of "What did I do last weekend", which is a result of the voice recognition, and input of results of the language analysis.

For example, the language analysis by the language analysis unit 163 estimates the user's intention to "inquire about the schedule in the last weekend". The dialogue processing unit 181 specifies that the user "played soccer in Sanda/Mita" last weekend, for example, by referring to the response database 182 and the dialogue history storage unit 183, and generates the response text of "You played soccer in Sanda/Mita".

The pronunciation information addition processing unit 184 refers to the history stored in the pronunciation information addition history storage unit 186, and adds, as the reading of the character string of "Sanda/Mita" included in the response text, "Sanda", which is the same reading as the reading added in the past.

As a result, the information processing server 2 can cause the information processing terminal 1 to output a response voice of "You played soccer in Sanda", which uses "Sanda" as the reading of the character string of "Sanda/Mita", as illustrated in a balloon #44 in FIG. 14.

As described above, it is possible to add the pronunciation information to the character string included in the response text with reference to the history stored in the pronunciation information addition history storage unit 186.

In a case where a plurality of users uses the information processing terminal 1, the history of addition of the pronunciation information may be managed for each user.

In this case, an utterer is identified on the basis of an utterance voice or on the basis of an image captured by the camera 56 provided in the information processing terminal 1, and the history of addition of the pronunciation information is managed for each user identified as the utterer. Furthermore, the pronunciation information is added to the character string included in the response text with reference to the history for each user identified as the utterer.

As a result, for example, it is possible to correctly communicate each of a schedule of a user A "playing soccer in Sanda" and a schedule of a user B "meeting in Mita".

That is, the pronunciation information addition processing unit 184 can add the reading of "Sanda" to the character string of "Sanda/Mita" included in the response text generated on the basis of a request utterance of the user A. Furthermore, the pronunciation information addition processing unit 184 can add the reading of "Mita" to the character string of "Sanda/Mita" included in the response text generated on the basis of a request utterance of the user B.

<<Operation of Information Processing System>>

Here, the operation of the information processing server 2 having the configuration as described above will be described.

Figure 15:
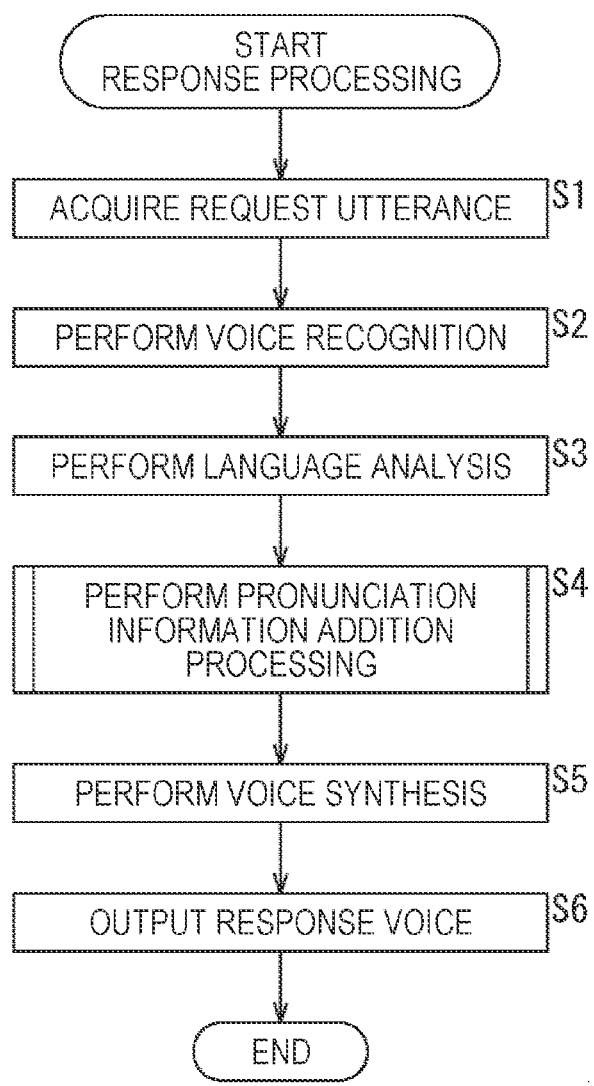
FIG. 15 is a flowchart for describing response processing of the information processing server.

First, response processing of the information processing server 2 will be described with reference to a flowchart of FIG. 15.

In step S1, the voice acquisition unit 161 acquires the voice data of the request utterance transmitted from the information processing terminal 1.

In step S2, the voice recognition unit 162 performs the voice recognition on the voice data of the request utterance. The utterance text and the pronunciation information obtained by the voice recognition are output to the language analysis unit 163 and the dialogue management unit 164.

In step S3, the language analysis unit 163 performs the language analysis on the utterance text. The information indicating the intention of the user estimated by the language analysis and the information regarding the character string extracted from the utterance text are supplied to the dialogue management unit 164.

In step S4, the dialogue management unit 164 performs pronunciation information addition processing. The pronunciation information addition processing generates the response text, and the pronunciation information is added to the character string included in the response text. The details of the pronunciation information addition processing will be described later with reference to a flowchart of FIG. 16.

In step S5, the voice synthesis unit 165 performs the voice synthesis on the basis of the response text, and generates the response voice having the pronunciation indicated by the pronunciation information.

In step S6, the voice synthesis unit 165 transmits the response voice data obtained by performing the voice synthesis to the information processing terminal 1, and causes the information processing terminal 1 to output the response voice.

The above processing is performed every time the voice data of the request utterance is transmitted from the information processing terminal 1.

Figure 16:
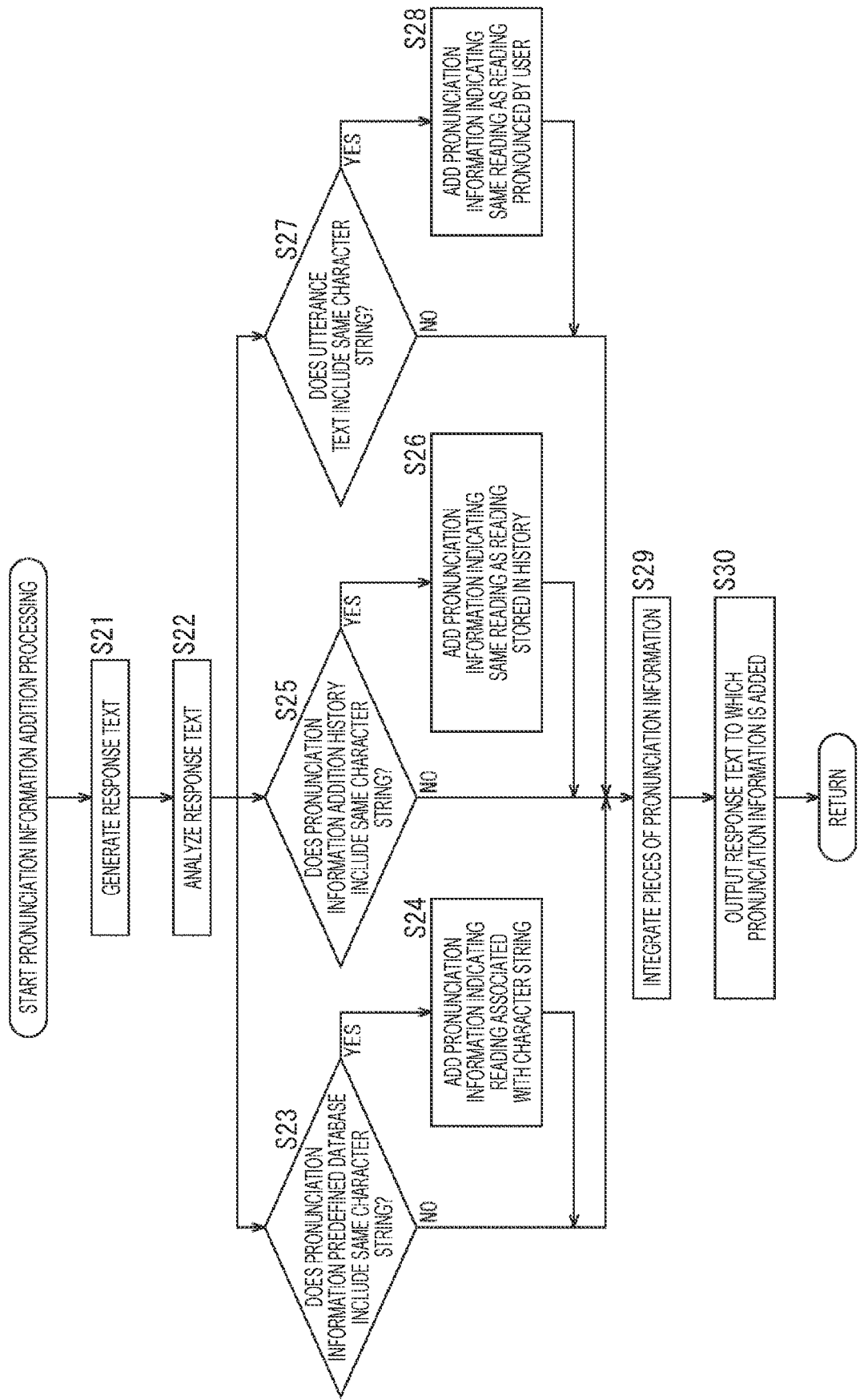
FIG. 16 is a flowchart for describing pronunciation information addition processing performed in step S4 of FIG. 15.

Next, the pronunciation information addition processing performed in step S4 of FIG. 15 will be described with reference to the flowchart of FIG. 16.

In step S21, the dialogue processing unit 181 generates the response text, for example, by referring to the response database 182.

In step S22, the pronunciation information addition processing unit 184 analyzes the response text supplied from the dialogue processing unit 181.

A series of processing in steps S23, S24, and S25 is performed in parallel, for example, on the basis of an analysis result of the response text.

In step S23, the pronunciation information addition processing unit 184 determines whether or not the pronunciation information predefined database 185 stores the same character string as the character string included in the response text.

In a case where it is determined in step S23 that the pronunciation information predefined database 185 stores the same character string as the character string included in the response text, the processing proceeds to step S24.

In step S24, the pronunciation information addition processing unit 184 adds, to the character string included in the response text, the pronunciation information indicating a reading defined in the pronunciation information predefined database 185.

In a case where it is determined in step S23 that the pronunciation information predefined database 185 does not store the same character string as the character string included in the response text, the processing in step S24 is skipped.

Meanwhile, in step S25, the pronunciation information addition processing unit 184 determines whether or not the pronunciation information addition history storage unit 186 stores the same character string as the character string included in the response text.

In a case where it is determined in step S25 that the pronunciation information addition history storage unit 186 stores the same character string as the character string included in the response text, the processing proceeds to step S26.

In step S26, the pronunciation information addition processing unit 184 adds, to the character string included in the response text, the pronunciation information indicating the same reading as a reading stored in the pronunciation information addition history storage unit 186.

In a case where it is determined in step S25 that the pronunciation information addition history storage unit 186 does not store the same character string as the character string included in the response text, the processing in step S26 is skipped.

Meanwhile, in step S27, the pronunciation information addition processing unit 184 determines whether or not the utterance text includes the same character string as the character string included in the response text.

In a case where it is determined in step S27 that the utterance text includes the same character string as the character string included in the response text, the processing proceeds to step S28.

In step S28, the pronunciation information addition processing unit 184 adds, to the character string included in the response text, the pronunciation information indicating the same reading as a reading pronounced by the user at the time of the request utterance.

In a case where it is determined in step S27 that the utterance text does not include the same character string as the character string included in the response text, the processing in step S28 is skipped.

In step S29, the pronunciation information addition processing unit 184 integrates the pieces of pronunciation information added to the character string included in the response text. That is, the piece of pronunciation information indicating the reading defined in the pronunciation information predefined database 185 (first piece of pronunciation information), the piece of pronunciation information indicating the reading added in the past (second piece of pronunciation information), and the piece of pronunciation information indicating the same reading as the reading pronounced by the user (third piece of pronunciation information) are appropriately integrated.

For example, in a case where the first to third pieces of pronunciation information are added to one character string included in the response text, the first to third pieces of pronunciation information are integrated into one piece of pronunciation information selected according to the priority.

Furthermore, in a case where the first piece of pronunciation information and the second piece of pronunciation information indicate the same reading, and the third piece of pronunciation information indicates a different reading, the first to third pieces of pronunciation information are integrated into information indicating the reading indicated by the first piece of pronunciation information and the second piece of pronunciation information, so to speak, by majority decision.

As described above, the method of integrating the pieces of pronunciation information added by use of the three methods is arbitrary.

In step S30, the pronunciation information addition processing unit 184 outputs the response text to which the pronunciation information is added. Thereafter, the processing returns to step S4 of FIG. 15 and the subsequent processing is performed.

Next, pronunciation information addition history storage processing will be described with reference to a flowchart of FIG. 17.

Figure 17:
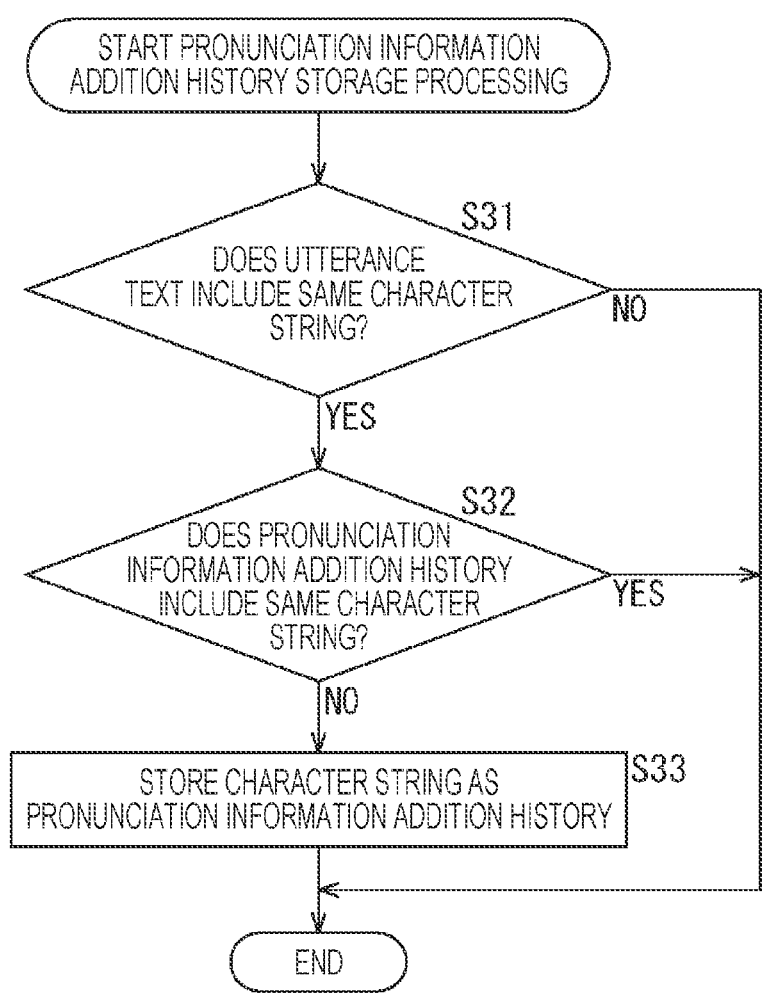
FIG. 17 is a flowchart for describing pronunciation information addition history storage processing of the information processing server.

The processing of FIG. 17 is performed by the pronunciation information addition processing unit 184 on the basis of the analysis result of the response text, for example, every time the pronunciation information is added.

In step S31, the pronunciation information addition processing unit 184 determines whether or not the utterance text includes the same character string as the character string included in the response text.

In a case where it is determined in step S31 that the utterance text includes the same character string as the character string included in the response text, in step S32, the pronunciation information addition processing unit 184 determines whether or not the pronunciation information addition history storage unit 186 stores the same character string as the character string included in the response text.

In a case where it is determined in step S32 that the same character string as the character string included in the response text is not stored, in step S33, the pronunciation information addition processing unit 184 causes the pronunciation information addition history storage unit 186 to store the character string included in the response text and the pronunciation information added to the character string.

After the character string and the pronunciation information are stored as a history in the pronunciation information addition history storage unit 186, the processing ends. In a case where it is determined in step S31 that the utterance text does not include the same character string as the character string included in the response text, or in a case where it is determined that the pronunciation information addition history storage unit 186 does not store the same character string, the processing ends similarly.

When the above processing is repeated, the reading of each character string is accumulated and managed as a history on the basis of the reading pronounced by the user. By managing the history of the character string to which the pronunciation information is added, the information processing server 2 can respond to the request utterance of the user with a correct pronunciation.

<<Modified Example>>

Although all processing of the voice recognition, the language analysis, the response generation, and the voice synthesis is assumed to be performed by the information processing server 2, at least one of the four types of processing may be performed by the information processing terminal 1. It is also possible to allow the information processing terminal 1 to perform all processing of the voice recognition, the language analysis, the response generation, and the voice synthesis.

Furthermore, the above technology can be applied not only to the smart speaker but also to various devices using the voice dialogue. For example, as the information processing terminal 1, various devices such as a smartphone, a tablet terminal, a personal computer, a car navigation device, and a television receiver can be used.

The processing of the dialogue management unit 164 that receives, as an input, the request utterance by the user and outputs the response text to which the pronunciation information is added may be achieved by use of a neural network.

Figure 18:
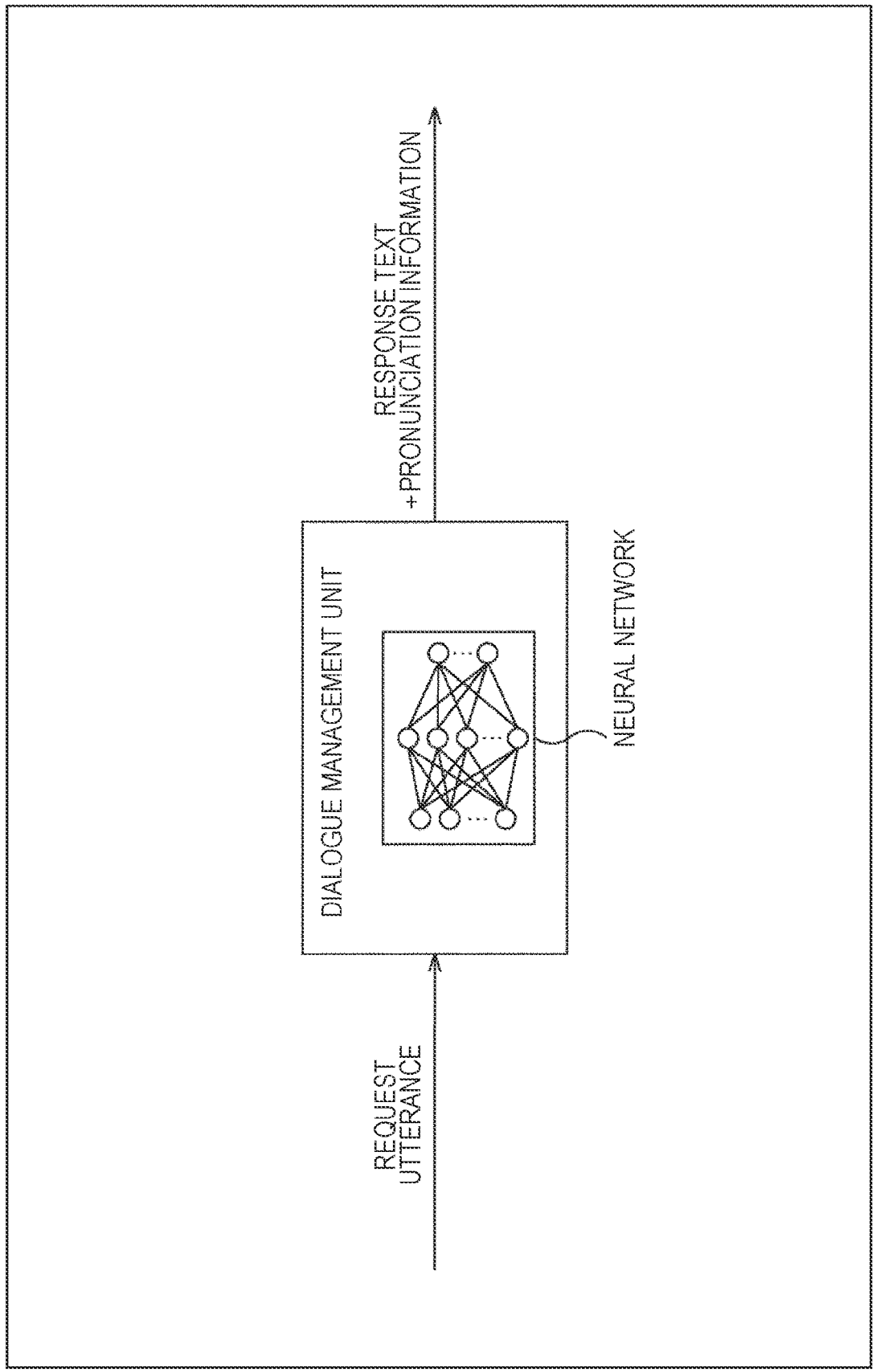
FIG. 18 is a diagram illustrating a concept of other processing of the information processing server.

FIG. 18 is a diagram illustrating a concept of other processing of the information processing server 2.

A neural network included in the dialogue management unit 164 of FIG. 18 is a neural network that receives, as an input, the request utterance by the user and outputs the response text to which the pronunciation information is added. The neural network obtained by performing learning by use of various request utterances as learning data is prepared for the dialogue management unit 164.

<Configuration Example of Computer>

The series of processing described above can be executed by hardware or software. In a case where the series of processing is executed by software, a program constituting the software is installed from a program recording medium on a computer embedded in dedicated hardware, a general-purpose personal computer, or the like.

The program to be installed is provided by being recorded on the removable medium 111 illustrated in FIG. 8 including an optical disk (compact disc-read only memory (CD-ROM), digital versatile disc (DVD), or the like), a semiconductor memory, and the like. Furthermore, the program to be installed may also be provided via a wired or wireless transmission medium such as a local area network, the Internet, or digital broadcasting. The program can be pre-installed in the ROM 102 or the storage unit 108.

The program executed by the computer may be a program in which the processing is performed in time series in the order described in the present specification, or may be a program in which the processing is performed in parallel or at a necessary timing such as when a call is made.

Note that, in the present specification, a system means a set of a plurality of components (devices, modules (parts), and the like), and it does not matter whether or not all the components are in the same housing. Therefore, a plurality of devices housed in separate housings and connected via a network, and one device in which a plurality of modules is housed in one housing are both systems.

The effects described in the present specification are merely examples and are not limited, and other effects may be obtained.

Embodiments of the present technology are not limited to the above-described embodiment, and various modifications can be made without departing from the gist of the present technology.

For example, the present technology can take a configuration of cloud computing in which one function is shared and processed together by a plurality of devices via a network.

Furthermore, each step described in the above-described flowchart can be executed by one device or shared and executed by a plurality of devices.

Moreover, in a case where one step includes a plurality of sets of processing, the plurality of sets of processing included in the one step can be executed by one device or shared and executed by a plurality of devices.

<Combination Examples of Configurations>

The present technology can have the following configurations.

(1) An information processing device including
a dialogue management unit that generates a response text indicating contents of a response to an utterance of a user on the basis of an utterance text indicating contents of the utterance of the user, and outputs the response text to which pronunciation information indicating a reading of a character string included in the response text is added.

(2) The information processing device according to (1), in which
the dialogue management unit adds the pronunciation information indicating a reading of at least a part of character strings included in the response text.

(3) The information processing device according to (1) or (2), in which
the dialogue management unit adds the pronunciation information indicating a prosody of the response text.

(4) The information processing device according to any of (1) to (3), further including
a voice recognition unit that performs voice recognition on voice data obtained by detecting the utterance of the user, and generates the utterance text.

(5) The information processing device according to any of (1) to (4), further including
a voice synthesis unit that performs voice synthesis on the basis of the response text so as to output a voice with the reading indicated by the pronunciation information.

(6) The information processing device according to any of (1) to (5), in which
in a case where the response text includes a predetermined character string that is same as a character string included in the utterance text, the dialogue management unit adds the pronunciation information indicating, as a reading of the predetermined character string included in the response text, a reading that is same as a reading pronounced by the user.

(7) The information processing device according to any of (1) to (5), in which
the dialogue management unit refers to a database that defines a reading of each character string, and adds the pronunciation information indicating a reading defined in the database as a reading of a predetermined character string included in the response text.

(8) The information processing device according to (7), further including an analysis unit that analyzes the utterance text, and estimates an intention of the utterance of the user, in which in a case where a plurality of readings is defined in the database as the reading of the predetermined character string, the dialogue management unit adds the pronunciation information indicating a reading according to the intention of the utterance of the user.

(9) The information processing device according to (7), in which in a case where a plurality of readings is defined in the database as the reading of the predetermined character string included in the response text, the dialogue management unit adds the pronunciation information indicating a reading according to a running application.

(10) The information processing device according to any of (1) to (5), further including a history storage unit that stores a history related to addition of the pronunciation information, in which the dialogue management unit refers to the history, and adds the pronunciation information indicating, as a reading of a predetermined character string included in the response text, a reading that is same as a reading added in a past.

(11) The information processing device according to (1), in which the dialogue management unit outputs the response text to which the pronunciation information is added, which is output from a neural network in response to input of the utterance text.

(12) An information processing method performed by an information processing device, the information processing method including:

generating a response text indicating contents of a response to an utterance of a user on the basis of an utterance text indicating contents of the utterance of the user; and outputting the response text to which pronunciation information indicating a reading of a character string included in the response text is added.

(13) A program that causes a computer to execute:

generating a response text indicating contents of a response to an utterance of a user on the basis of an utterance text indicating contents of the utterance of the user; and outputting the response text to which pronunciation information indicating a reading of a character string included in the response text is added.

REFERENCE SIGNS LIST

1 Information processing terminal
2 Information processing server
151 Voice processing unit
161 Voice acquisition unit
162 Voice recognition unit
163 Language analysis unit
164 Dialogue management unit
165 Voice synthesis unit
181 Dialogue processing unit
182 Response database
183 Dialogue history storage unit
184 Pronunciation information addition processing unit
185 Pronunciation information predefined database
186 Pronunciation information addition history storage unit

The invention claimed is:

1. An information processing device, comprising:
a database configured to store a first character string and first pronunciation information that indicates a reading of the first character string; and
a dialogue management unit configured to:
acquire an utterance text indicating contents of an utterance of a user;
generate, based on the utterance text, a response text indicating contents of a response to the utterance of the user;
determine the first character string stored in the database is same as a second character string included in the response text;
add, to the response text, the first pronunciation information indicating the reading of the first character string as a reading of the second character string included in the response text,
wherein the addition of the first pronunciation information is based on the determination that the first character string stored in the database is same as the second character string included in the response text;
determine a third character string included in the response text is same as a fourth character string included in the utterance text;
add, to the response text, second pronunciation information as a reading of the third character string included in the response text, wherein
the second pronunciation information is associated with the fourth character string,
the second pronunciation information indicates a reading of the fourth character string as pronounced by the user, and
the addition of the second pronunciation information is based on the determination that the fourth character string in the utterance text is same as the third character string included in the response text;
integrate, into the response text, the first pronunciation information of the second character string and the second pronunciation information of the third character string;
output, using a neural network, the response text to which the first pronunciation information and the second pronunciation information is added, wherein the output of the response text is based on the integration; and
control, based on the output of the response text to which both the first pronunciation information and the second pronunciation information are added, a terminal to output a voice with the reading indicated by both the first pronunciation information and the second pronunciation information.

2. The information processing device according to claim 1, wherein
the dialogue management unit is further configured to add third pronunciation information indicating a reading of each of a plurality of character strings included in the response text, and
the plurality of character strings includes the second character string and the third character string.

3. The information processing device according to claim 1, wherein the dialogue management unit is further configured to add the first pronunciation information indicating a prosody of the response text.

4. The information processing device according to claim 1, further comprising a voice recognition unit configured to:

perform voice recognition on voice data obtained by detection of the utterance of the user, and generate the utterance text based on the voice recognition.

5. The information processing device according to claim 1, further comprising a voice synthesis unit configured to perform voice synthesis based on the response text for the output of the voice with the reading indicated by the first pronunciation information and the second pronunciation information.

6. The information processing device according to claim 1, further comprising an analysis unit configured to:

analyze the utterance text, and estimate an intention of the utterance of the user based on the analysis of the utterance text, wherein in a case where a plurality of readings is defined in the database as the reading of the second character string, the dialogue management unit is further configured to add the first pronunciation information indicating the reading based on the intention of the utterance of the user.

7. The information processing device according to claim 1, wherein in a case where a plurality of readings is defined in the database as the reading of the second character string included in the response text, the dialogue management unit is further configured to add the first pronunciation information indicating the reading based on a running application.

8. The information processing device according to claim 1, further comprising a history storage unit configured to store a history related to the addition of the first pronunciation information, wherein the dialogue management unit is further configured to refer to the history, and add third pronunciation information indicating, as the reading of the second character string included in the response text, a reading that is same as a reading added in a past.

9. An information processing method performed by an information processing device, the information processing method comprising:

storing, in a database, a first character string and first pronunciation information that indicates a reading of the first character string;

acquiring an utterance text indicating contents of an utterance of a user;

generating, based on the utterance text, a response text indicating contents of a response to the utterance of the user;

determining the first character string stored in the database is same as a second character string included in the response text;

adding, to the response text, the first pronunciation information indicating the reading of the first character string as a reading of the second character string included in the response text, wherein the addition of the first pronunciation information is based on the determination that the first character string stored in the database is same as the second character string included in the response text;

determining a third character string included in the response text is same as a fourth character string included in the utterance text;

adding, to the response text, second pronunciation information as a reading of the third character string included in the response text, wherein the second pronunciation information is associated with the fourth character string, the second pronunciation information indicates a reading of the fourth character string as pronounced by the user, and the addition of the second pronunciation information is based on the determination that the fourth character string in the utterance text is same as the third character string included in the response text;

integrating, into the response text, the first pronunciation information of the second character string and the second pronunciation information of the third character string;

outputting, using a neural network, the response text to which the first pronunciation information and the second pronunciation information is added, wherein the output of the response text is based on the integration; and controlling, based on the output of the response text to which both the first pronunciation information and the second pronunciation information are added, a terminal to output a voice with the reading indicated by both the first pronunciation information and the second pronunciation information.

10. A non-transitory computer-readable medium having stored thereon, computer-executable instructions which, when executed by a computer, cause the computer to execute operations, the operations comprising:

storing, in a database, a first character string and first pronunciation information that indicates a reading of the first character string;

acquiring an utterance text indicating contents of an utterance of a user;

generating, based on the utterance text, a response text indicating contents of a response to the utterance of the user;

determining the first character string stored in the database is same as a second character string included in the response text;

adding, to the response text, the first pronunciation information indicating the reading of the first character string as a reading of the second character string included in the response text, wherein the addition of the first pronunciation information is based on the determination that the first character string stored in the database is same as the second character string included in the response text;

determining a third character string included in the response text is same as a fourth character string included in the utterance text;

adding, to the response text, second pronunciation information as a reading of the third character string included in the response text, wherein the second pronunciation information is associated with the fourth character string, the second pronunciation information indicates a reading of the fourth character string as pronounced by the user, and the addition of the second pronunciation information is based on the determination that the fourth character string in the utterance text is same as the third character string included in the response text;

integrating, into the response text, the first pronunciation information of the second character string and the second pronunciation information of the third character string;

outputting, using a neural network, the response text to which the first pronunciation information and the second pronunciation information is added, wherein the output of the response text is based on the integration; and controlling, based on the output of the response text to which both the first pronunciation information and the second pronunciation information are added, a terminal to output a voice with the reading indicated by both the first pronunciation information and the second pronunciation information.

* * * * *